US010025493B2

(12) United States Patent
Murata

(10) Patent No.: US 10,025,493 B2
(45) Date of Patent: Jul. 17, 2018

(54) INFORMATION PROCESSING DEVICE, INFORMATION PROCESSING METHOD, AND PROGRAM FOR DISPLAYING LIST ITEMS AND CHANGING HIERARCHICAL LEVEL OF DISPLAY

(75) Inventor: Yu Murata, Tokyo (JP)

(73) Assignee: SONY CORPORATION, Tokyo (JP)

(*) Notice: Subject to any disclaimer, the term of this patent is extended or adjusted under 35 U.S.C. 154(b) by 508 days.

(21) Appl. No.: 13/557,542

(22) Filed: Jul. 25, 2012

(65) Prior Publication Data

US 2013/0036384 A1 Feb. 7, 2013

(30) Foreign Application Priority Data

Aug. 1, 2011 (JP) ................................. 2011-168261

(51) Int. Cl.
*G06F 3/048* (2013.01)
*G06F 3/0488* (2013.01)
*G06F 3/0482* (2013.01)

(52) U.S. Cl.
CPC ........ *G06F 3/04883* (2013.01); *G06F 3/0482* (2013.01); *G06F 3/04886* (2013.01); *G06F 2203/04808* (2013.01)

(58) Field of Classification Search
CPC ................. G06F 3/0481; G06F 3/0482; G06F 2203/04806; G06F 3/04883; G06F 3/04886; G06F 2203/04808
USPC .......................................................... 715/815
See application file for complete search history.

(56) References Cited

U.S. PATENT DOCUMENTS

| | | | |
|---|---|---|---|
| 5,784,061 A * | 7/1998 | Moran et al. ................. 715/863 |
| 2010/0070913 A1* | 3/2010 | Murrett et al. ............... 715/786 |
| 2010/0088641 A1* | 4/2010 | Choi ............................. 715/828 |
| 2010/0090971 A1 | 4/2010 | Choi et al. |
| 2010/0134425 A1* | 6/2010 | Storrusten ............. G06F 3/0425 345/173 |
| 2010/0162179 A1* | 6/2010 | Porat ..................... G06F 3/0481 715/863 |
| 2010/0283743 A1* | 11/2010 | Coddington .................. 345/173 |
| 2011/0074828 A1 | 3/2011 | Capela et al. |
| 2011/0163971 A1* | 7/2011 | Wagner ............... G06F 3/04817 345/173 |
| 2012/0042251 A1* | 2/2012 | Rodriguez ........... G11B 27/034 715/723 |

(Continued)

FOREIGN PATENT DOCUMENTS

| | | |
|---|---|---|
| EP | 2161722 A1 | 3/2010 |
| JP | 2007-164298 | 6/2007 |

(Continued)

OTHER PUBLICATIONS

Jun. 2, 2015, Japanese Office Action for related JP application No. 2011-168261.

(Continued)

*Primary Examiner* — Kieu Vu
*Assistant Examiner* — Asteway T Gattew
(74) *Attorney, Agent, or Firm* — Paratus Law Group, PLLC

(57) ABSTRACT

Provided is an information processing device including a detection unit configured to detect a user operation, and a display control unit configured to display a list including list items, and perform display of, in response to a detected user operation, causing new list items to gradually appear in the list.

21 Claims, 27 Drawing Sheets

(56) References Cited

U.S. PATENT DOCUMENTS

2012/0192110 A1* 7/2012 Wu .............................. 715/815

FOREIGN PATENT DOCUMENTS

| | | |
|---|---|---|
| JP | 2008-027001 | 2/2008 |
| JP | 2009-252168 | 10/2009 |
| JP | 2010-277183 | 12/2010 |
| JP | 2010-283538 | 12/2010 |
| JP | 2011-003977 | 1/2011 |
| JP | 2012-504837 | 2/2012 |
| JP | 2012-505466 | 3/2012 |
| WO | WO2010/029506 A1 | 3/2010 |
| WO | WO2010/041826 A2 | 4/2010 |
| WO | WO2010/044576 A2 | 4/2010 |

OTHER PUBLICATIONS

Jan. 25, 2016, Extended European Search Report for related EP Application No. 12172995.8.
Sep. 20, 2016, JP communication issued for related JP application No. 2015-237835.
Aug. 19, 2016, CN communication issued for related CN application No. 201210261480.8.
Feb. 28, 2017, JP communication (Dispatch No. 079836) issued for related JP application No. 2015-237835.
Feb. 28, 2017, JP communication (Dispatch No. 079837) issued for related JP application No. 2015-237835.

* cited by examiner

FIG. 9
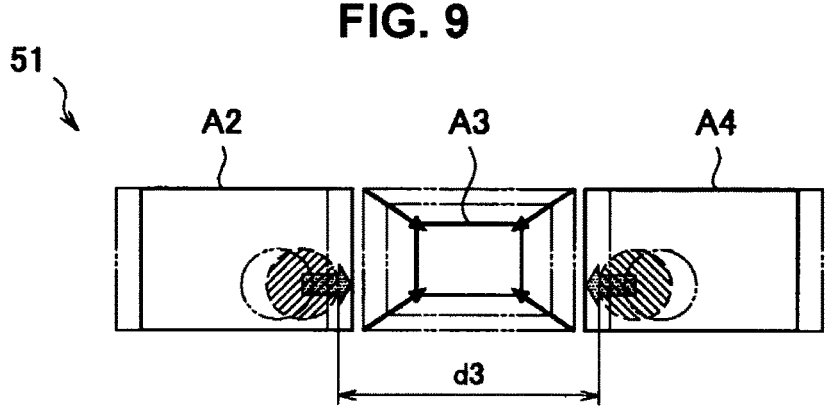
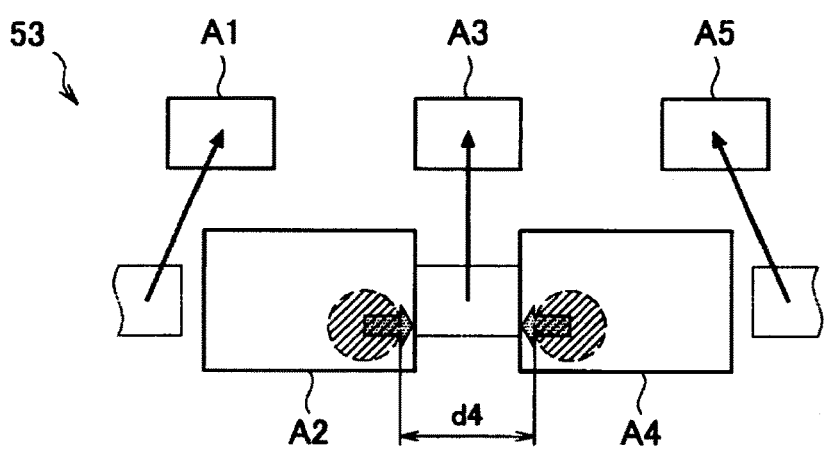
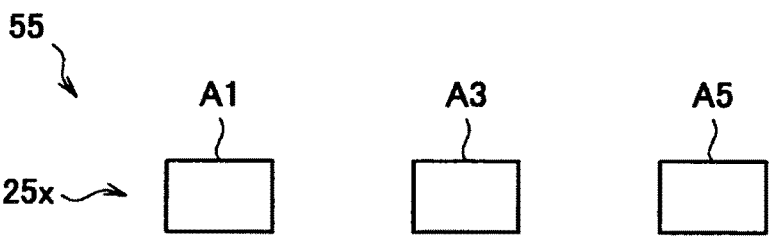
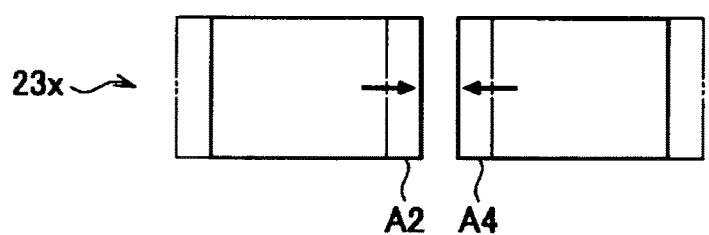

FIG. 11
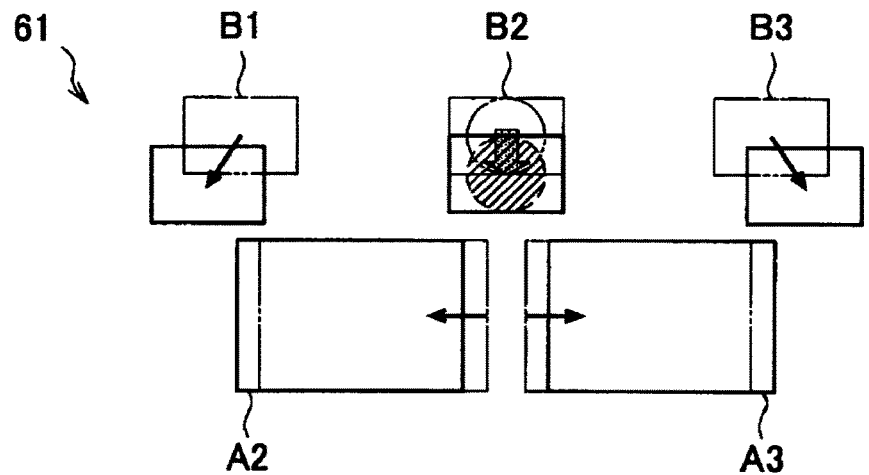
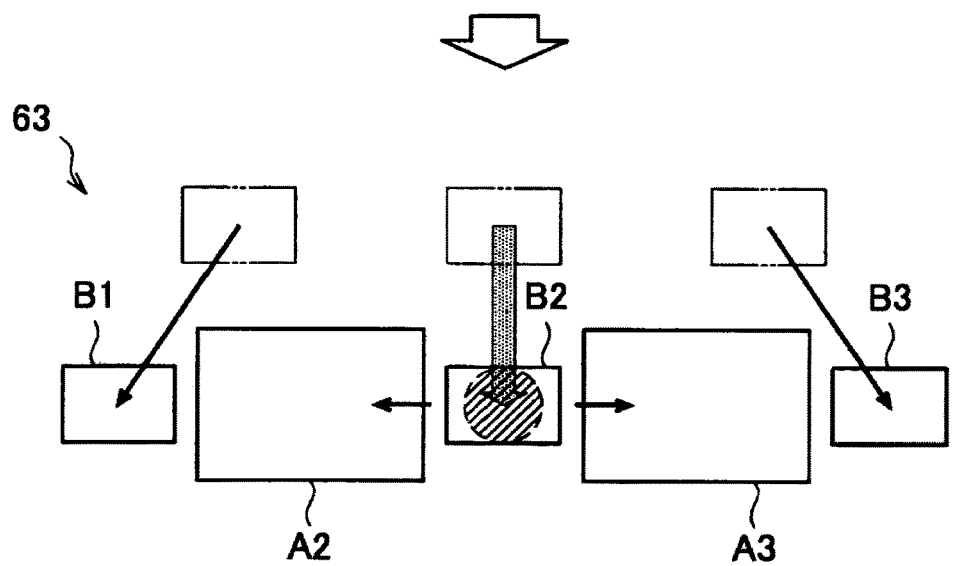
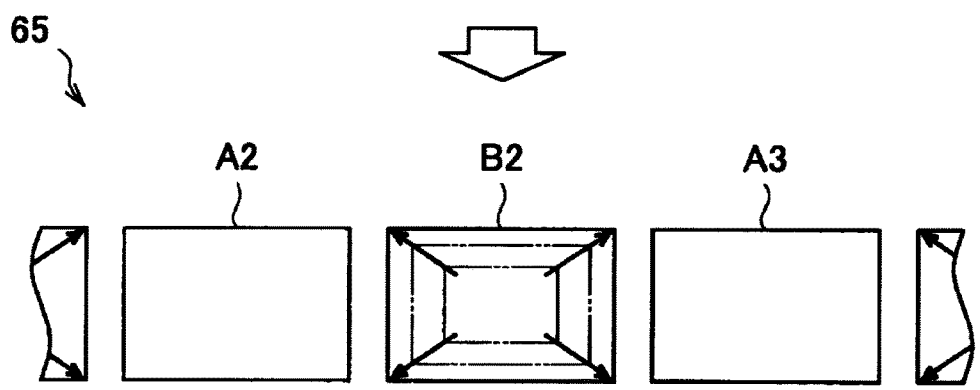

FIG. 29
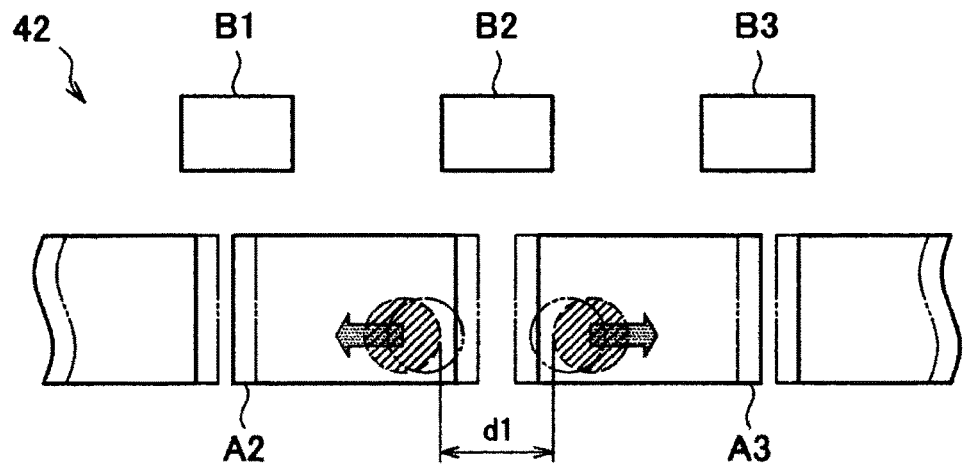
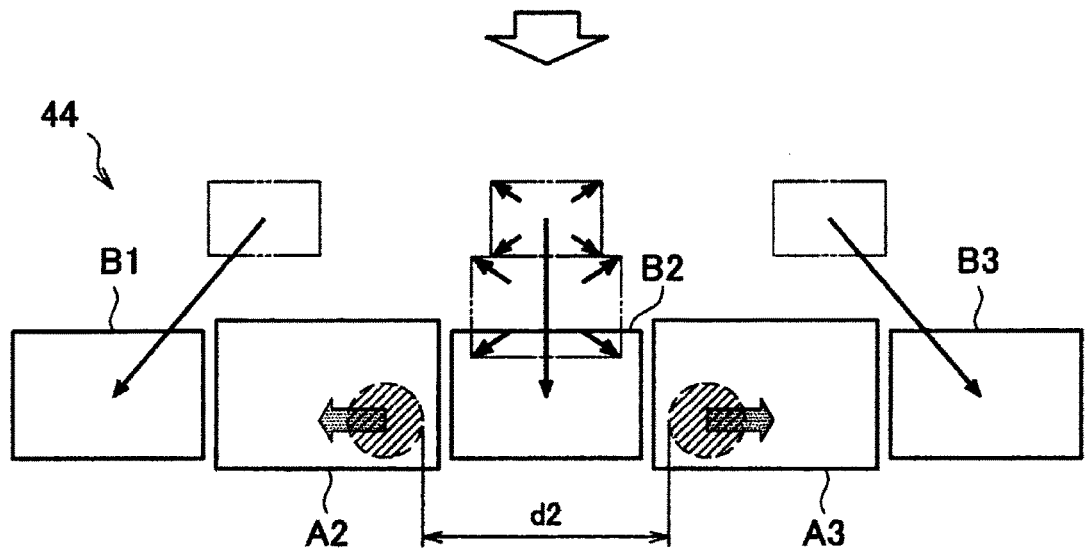
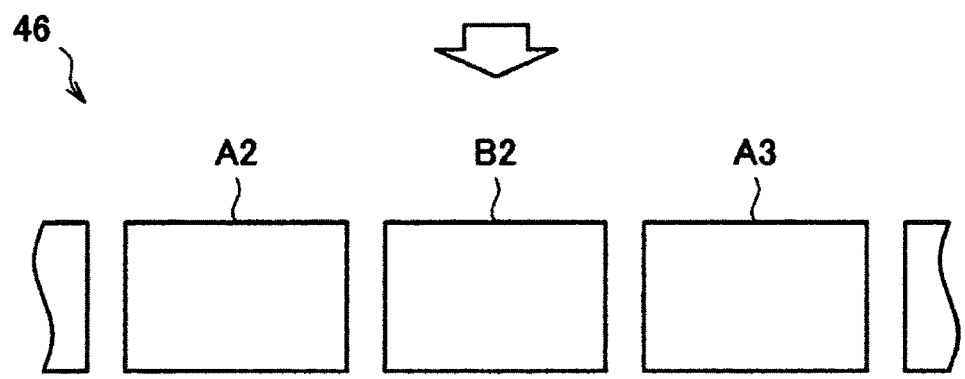

INFORMATION PROCESSING DEVICE, INFORMATION PROCESSING METHOD, AND PROGRAM FOR DISPLAYING LIST ITEMS AND CHANGING HIERARCHICAL LEVEL OF DISPLAY

BACKGROUND

The present disclosure relates to an information processing device, an information processing method, and a program.

In recent years, there has been known a UI (User Interface) that displays a plurality of thumbnail images on a display screen, which can be operated by a user, and allows the user to select the thumbnail image(s).

For example, there is known a UI that creates and displays thumbnail images from scenes of every predetermined time interval among scenes that constitute moving image data. Such a UI can reproduce moving image data from a scene desired by a user by making the user select a given thumbnail image.

Note that the number of thumbnail images displayed on the UI increases or decreases in accordance with the time intervals of scenes taken out of moving image data. Accordingly, when a user performs an operation of increasing the number of thumbnail images, for example, the UI displays thumbnail images of scenes of shorter time intervals. As a user operation of increasing or decreasing the number of thumbnail images, the following technology is known.

For example, a display device disclosed in JP 2011-003977A displays, when a pinch-put operation is performed on a thumbnail image of moving image data, thumbnail images of shorter time intervals. Accordingly, a user can easily check the details of each scene.

SUMMARY

However, when the number of list items displayed on the UI, such as thumbnail images or icons, is increased in response to a user operation, it is difficult for the user to know in advance what kind of list items are to be added to the list.

Accordingly, it is desirable to provide an information processing device, an information processing method, and a program that are novel and improved and that allow a user to recognize in advance list items to be added to the list.

According to an embodiment of the present disclosure, there is provided an information processing device including a detection unit configured to detect a user operation; and a display control unit configured to display a list including list items, and perform display of, in response to a detected user operation, causing new list items to gradually appear in the list.

According to another embodiment of the present disclosure, there is provided an information processing method including detecting a user operation; and displaying a list including list items, and performing display of, in response to a detected user operation, causing new list items to gradually appear in the list.

According to still another embodiment of the present disclosure, there is provided a program causing a computer to execute: detecting a user operation; and displaying a list including list items, and performing display of, in response to a detected user operation, causing new list items to gradually appear in the list.

As described above, according to the present disclosure, it is possible to, by causing new list items to gradually appear in the displayed list, allow a user to recognize in advance list items to be added before the completion of the coupling.

As described above, according to the present disclosure, it is possible to allow a user to recognize in advance list items to be added to a list.

BRIEF DESCRIPTION OF THE DRAWINGS

FIG. 9 is screen transition diagram illustrating an animation when lists are separated in conjunction with a pinch-in operation in accordance with this embodiment;

FIG. 11 is a screen transition diagram illustrating an animation when lists are coupled in conjunction with a drag operation in accordance with this embodiment;

FIG. 29 is a screen transition diagram illustrating an example of changing an animation when lists are coupled in conjunction with a pinch-out operation.

DETAILED DESCRIPTION OF THE EMBODIMENTS

Figure 1:
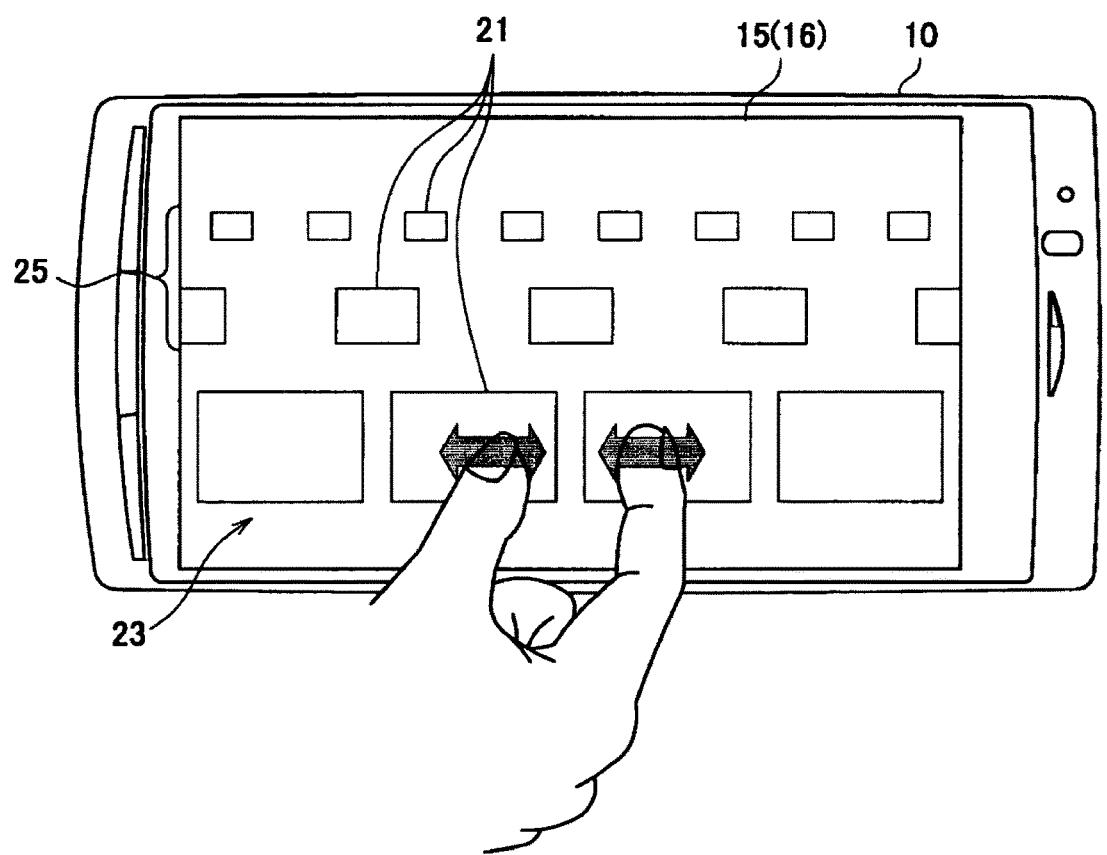
FIG. 1 is a diagram illustrating a summary of an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Embodiment of the Present Disclosure
1-1. Summary
1-2. Basic Configuration
2. Coupling/Separation of Plurality of Lists
2-1. Coupling of Plurality of Lists
2-2. Separation of List
2-3. User Operation
2-4. Other Exemplary Displays of Plurality of Lists
2-5. Change of Displayed Information
3. Coupling/Separation of List Items of Single List
3-1. Coupling of List Items of Single List
3-2. Separation of List Items
3-3. List Display
4. Operation Process
5. Conclusion The technology in accordance with the present disclosure described herein can be carried out in various forms as described in "1. Embodiment of the Present Disclosure" to "4. Operation Process" above. In addition, the information processing device 10 in accordance with an embodiment of the present disclosure includes (A) a detection unit (a touch panel 16) that detects a user operation, and (B) a display control unit (a GPU 112) that displays a single list including list items, and performs display control so that new list items are caused to gradually appear in the single list in response to the detected user operation.

1. Embodiment of the Present Disclosure

[1-1. Summary]

FIG. 1 is a diagram illustrating a summary of an embodiment of the present disclosure. As shown in FIG. 1, an information processing device 10 in accordance with this embodiment includes a display 15 and a touch panel 16 integrated with the display 15.

The information processing device 10 displays lists each having list items 21 on the display 15. For example, the information processing device 10 displays a target list 23 and a plurality of sub-lists 25 each having list items 21 as shown in FIG. 1. The sub-lists 25 display more detailed information than does the target list 23. In this embodiment, the target list 23 is displayed as a list to be operated by a user. However, the sub-lists 25 may also be operated by a user.

The information processing device 10, when a user has performed some operation or when the internal state of an application has changed, changes the method of displaying lists. More specifically, the information processing device 10 performs display control so that lists are coupled/separated in response to a user operation detected by the touch panel 16. When coupling lists, the information processing device 10 couples the sub-list 25 to the target list 23 by gradually moving the sub-list 25 closer to the target list 23, for example. Meanwhile, when separating lists, the information processing device 10 creates a new sub-list 25 by arranging lists items 21 gradually separated from the target list 23, for example.

The information processing device 10, when coupling/separating lists displayed on the display 15, performs control of gradually changing each list item on the display screen. Accordingly, the user is able to, before the completion of the coupling/separation of the lists, check in advance the list items to be coupled to the target list 23 or the list items 21 to be separated from the target list 23. In addition, the user is also able to cancel the display control of coupling/separation before the completion thereof while checking the list items 21 to be coupled/separated.

The sub-list 25 is an auxiliary list of the target list 23. Thus, as described above, the sub-list 25 has arranged therein list items 21 that present more detailed information than does the target list 23. Accordingly, when lists are coupled, information that is presented by the target list 23 becomes more detailed. A change in the displayed information of each list by coupling/separation of the lists is described in detail in [2-5. Change of Displayed Information] below.

A summary of the information processing device 10 in accordance with an embodiment of the present disclosure has been described above. Next, the configuration of the information processing device 10 in accordance with this embodiment will be described with reference to FIG. 2.

[1-2. Basic Configuration]

Figure 2:
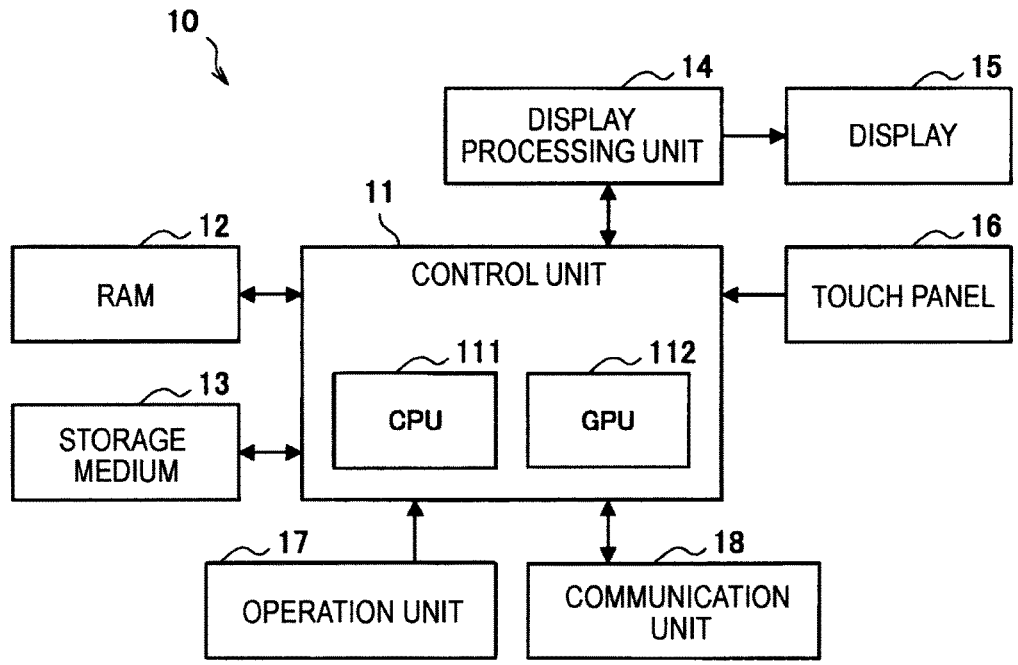
FIG. 2 is a block configuration diagram showing the configuration of an information processing device in accordance with this embodiment.

FIG. 2 is a block configuration diagram showing the configuration of the information processing device 10 in accordance with this embodiment. As shown in FIG. 2, the information processing device 10 includes a control unit 11, RAM 12, a storage medium 13, a display processing unit 14, a display 15, a touch panel 16, an operation unit 17, and a communication unit 18.

The control unit 11 functions as an arithmetic processing unit and a control unit, and controls each component of the information processing device 10. More specifically, as shown in FIG. 2, the control unit 11 in accordance with this embodiment includes a CPU (Central Processing Unit) 111 and a GPU (Graphics Processing Unit) 112.

The CPU 111 controls each component of the information processing device 10 in accordance with various programs. In addition, the CPU 111 may also be a microprocessor.

The GPU 112 is a display control unit that generates an image to be displayed on the display 15 or changes a display screen in response to a user operation. More specifically, the GPU 112 performs display control so that a plurality of lists each having list items 21 arranged therein are displayed on the display 15. In addition, the GPU 112 performs display control in response to a user operation so that list items 21 of a second list, which is a sub-list of the first list, is coupled to a first list.

Alternatively, the GPU 112 may perform display control so that a single list having list items 21 arranged therein is displayed on the display 15. In such a case, the GPU 112 may perform display control so that new list items gradually appear in the list in response to a user operation.

Meanwhile, the GPU 112 may also perform display control so that list items 21 are gradually separated from the first list in response to a user operation and a new list is created by arranging the separated list items 21.

The GPU 112 performs such display control of coupling/separating lists in response to a user operation detected by the touch panel 16. For example, the GPU 112, when a pinch-out/in operation is detected, performs display control so that lists are coupled/separated in accordance with a change in the distance between the two fingers touching the touch panel 16. Alternatively, the GPU 112 may perform display control so that lists are coupled/separated in accordance with the movement amount or the movement speed of the fingers touching the touch panel 16. Note that the display control of the GPU 112 performed in response to a user operation will be described in detail in <2. Coupling/Separation of Plurality of Lists> to <4. Operation Process>

The RAM (Random Access Memory) 12 temporarily stores programs used in the execution of the control unit 11, parameters that change as appropriate during the execution, and the like.

The storage medium 13 stores programs, operation parameters, and the like used by the control unit 11. The storage medium 13 also stores content such as moving image data and music files.

Note that the storage medium 13 may be, for example, nonvolatile memory such as flash ROM (or flash memory), EEPROM (Electrically Erasable Programmable Read-Only Memory), or EPROM (Erasable Programmable ROM); a magnetic disk such as a hard disk or a disc-shaped magnetic body; an optical disc such as CD (Compact Disc), DVD-R (Digital Versatile Disc Recordable), or BD (Blu-Ray Disc (registered trademark)); or a storage medium such as a MO (Magneto Optical) disk.

The display processing unit 14 causes the display 15 to output image data output from the GPU 112 in accordance with the display control of the GPU 112.

The display 15 is a display device that outputs a display screen input from the display processing unit 14. This display 15 may be, for example, a display device such as a liquid crystal display (LCD) or an organic EL (Electroluminescence) display. In addition, the display 15 in accordance with this embodiment displays a list including list icons 21, for example.

The touch panel 16 is a detection unit that detects a user operation on the screen. For example, the touch panel 16 detects the position of an input object such as a finger touching the screen (an operation position), and detects a user operation from a change in the operation position with time. Examples of user operations detected by the touch panel 16 include pinch-out, pinch-in, drag, flick, tap, and double-tap. This touch panel 16 is provided integrally with the display 15. In addition, the touch panel 16 outputs the detected user operation to the control unit 11. Although the touch panel 16 is given as an example of the detection unit in this embodiment, the information processing device 10 in accordance with the present disclosure is not limited thereto. For example, the information processing device 10 may use a detection unit that detects a user operation in a non-contact state such as a proximity sensor, for example.

The operation unit 17 receives an operation instruction of a user, and outputs information on the operation to the control unit 11. This operation unit 17 may be a physical construction such as a button or a switch.

The communication unit 18 is a module that communicates with a communication terminal. Specifically, the communication unit 18 includes a receiving unit that receives data from a communication terminal, and a transmitting unit that transmits data to the communication terminal. In addition, the communication unit 18 may transmit and receive data via short-range wireless communication such as Wi-Fi or Bluetooth.

The configuration of the information processing device 10 in accordance with this embodiment has been described in detail above. Next, display control performed by the GPU 112 of the information processing device 10 will be specifically described with reference to a specific example.

2. Coupling/Separation of Plurality of Lists

The GPU 112 displays a plurality of lists as described above and, in response to a user operation, couples the sub-list 25 to the target list 23 or separates the list items 21 from the target list 23, thereby increasing/decreasing the number of displayed list items 21 (the number of list items). Hereinafter, coupling of a plurality of lists and separation of a list will be sequentially described with reference to the drawings.

[2-1. Coupling of Plurality of Lists]

Figure 3:
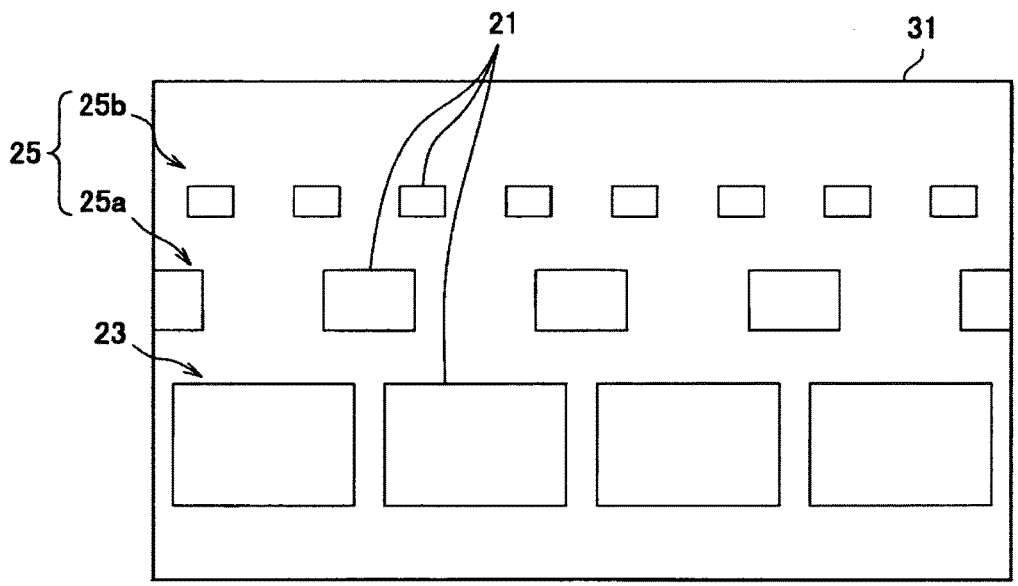
FIG. 3 is a diagram showing an exemplary display of a plurality of lists in accordance with this embodiment.

FIG. 3 is a diagram showing an exemplary display of a plurality of lists. As shown in FIG. 3, the GPU 112 performs control so that a screen 31, which displays a target list 23 and a plurality of sub-lists 25 each including list items 21, is displayed on the display 15.

As shown in FIG. 3, the list items 21 of the target list 23 are displayed in size that is larger than the list items 21 of the sub-list 25a displayed above the target list 23. In addition, the list items 21 of the sub-list 25a are displayed in size that is larger than the list items 21 of the sub-list 25b displayed above the sub-list 25a.

When a plurality of lists are displayed as described above, if a user operation indicating coupling of lists is detected, the GPU 112 performs display control so that the list items 21 of the sub-list 25 are gradually moved closer to the target list 23 and thus are coupled thereto. The coupling of the lists is performed with an animation such as the one shown in FIG. 4, for example.

Figure 4:
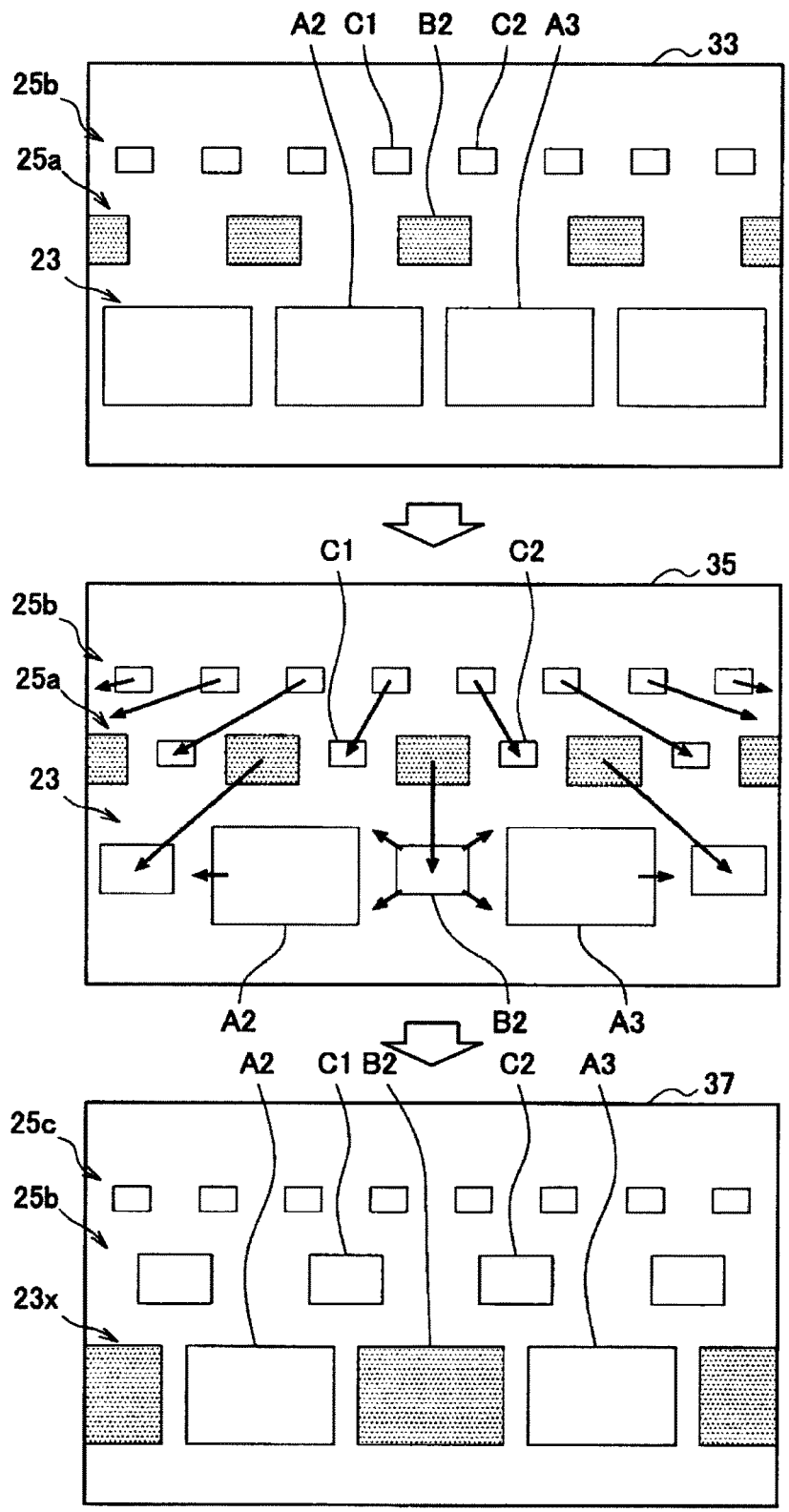
FIG. 4 is a screen transition diagram illustrating an animation of coupling a plurality of lists in accordance with this embodiment.

FIG. 4 is a screen transition diagram illustrating an animation of coupling a plurality of lists. As shown in a screen 33 in FIG. 4, the GPU 112 displays a target list 23 and sub-lists 25. When a user operation indicating coupling of lists is detected, the GPU 112 performs display control so that the lists are coupled as shown in a screen 35.

Specifically, the GPU 112 widens the space between each list item of the target list 23 as shown in the screen 35, and moves each list item of the sub-list 25a to the space between each list item of the target list 23. As described above, as the list items to be coupled to the target list 23 gradually move toward the target list 23, the user is able to check the list items to be increased by the coupling before the completion of the coupling. In addition, in this case, the GPU 112 gradually lowers the position of the sub-list 25b by one level and adjusts the size of the list items of the sub-list 25b as shown in the screen 35.

Then, as shown in a screen 37, the GPU 112 adjusts the size and position of the list items of the sub-list 25a so that they become uniform, and terminates the coupling. A target list 23x obtained after the coupling has an increased amount of information compared to the target list 23 before the coupling.

In addition, in the example shown in FIG. 4, as the GPU 112 has coupled the sub-list 25a, each of the remaining sub-lists is displayed at position lower by one level. Accordingly, a new sub-list 25c appears as shown in the screen 37.

As described above, when the GPU 112 in accordance with this embodiment displays a plurality of lists on the screen and moves each list item 21 of a list to be added in response to a user operation, it becomes possible for the user to check in advance the list items 21 to be increased by the coupling before the completion of the coupling. In addition, although the GPU 112 displays sub-lists 25 that are fragmented at respective levels, when the fragmentation limit is reached, the number of the displayed sub-lists 25 becomes zero. Accordingly, the user is able to intuitively know that the fragmentation of the target list 23 is no more possible.

Coupling of a plurality of lists has been described above. Although the aforementioned example shows a case in which the sub-list 25a is coupled to the target list 23, coupling of a plurality of lists in accordance with the present disclosure is not limited thereto. For example, sub-lists at a plurality of levels, such as the sub-list 25a and the sub-list 25b, may be coupled to the target list 23.

[2-2. Separation of List]

Next, separation of a list will be described. The GPU 112 first separates a predetermined number of list items from the target list 23 in response to a user operation to thereby reduce the amount of information of the target list 23. Then, the GPU 112 creates a new sub-list 25 by arranging the list items 21 separated from the target list 23, whereby separation of the list is completed.

The GPU 112 may perform such animation of separating a list in reverse order to that of the animation of coupling lists shown in the screen 33 to the screen 37 in FIG. 4. Specifically, the GPU 112 performs display control so that list items 21 to be separated from the target list 23 gradually become smaller in size and move away from the target list 23. Then, the GPU 112 creates a new sub-list 25 by arranging the separated list items 21.

As described above, as the GPU 112 in accordance with this embodiment gradually changes the display of the list items 21 to be separated from the target list 23, the user is able to check in advance the list items 21 to be decreased by the separation.

Separation of a list has been described above. Note that the sub-list(s) 25 to be newly created after being separated from the target list 23 may be arranged at either one level or more levels.

[2-3. User Operation]

The aforementioned coupling/separation of lists are performed in conjunction with various user operations. Examples of user operations include a pinch-out operation, a pinch-in operation, a drag operation, a flick operation, a tap/double-tap operation, and a button/bar operation. Hereinafter, coupling/separation of lists performed by the GPU 112 in response to each detected user operation will be sequentially described with reference to the drawings.

(Pinch-Out Operation)

The GPU 112, when a pinch-out operation is detected, couples lists in accordance with the pinch-out operation. Note that a pinch-out operation refers to a touch operation of, while touching two points on a screen with two fingers, widening the gap between the two fingers. Hereinafter, specific description will be made with reference to FIGS. 5 and 6.

Figure 5:
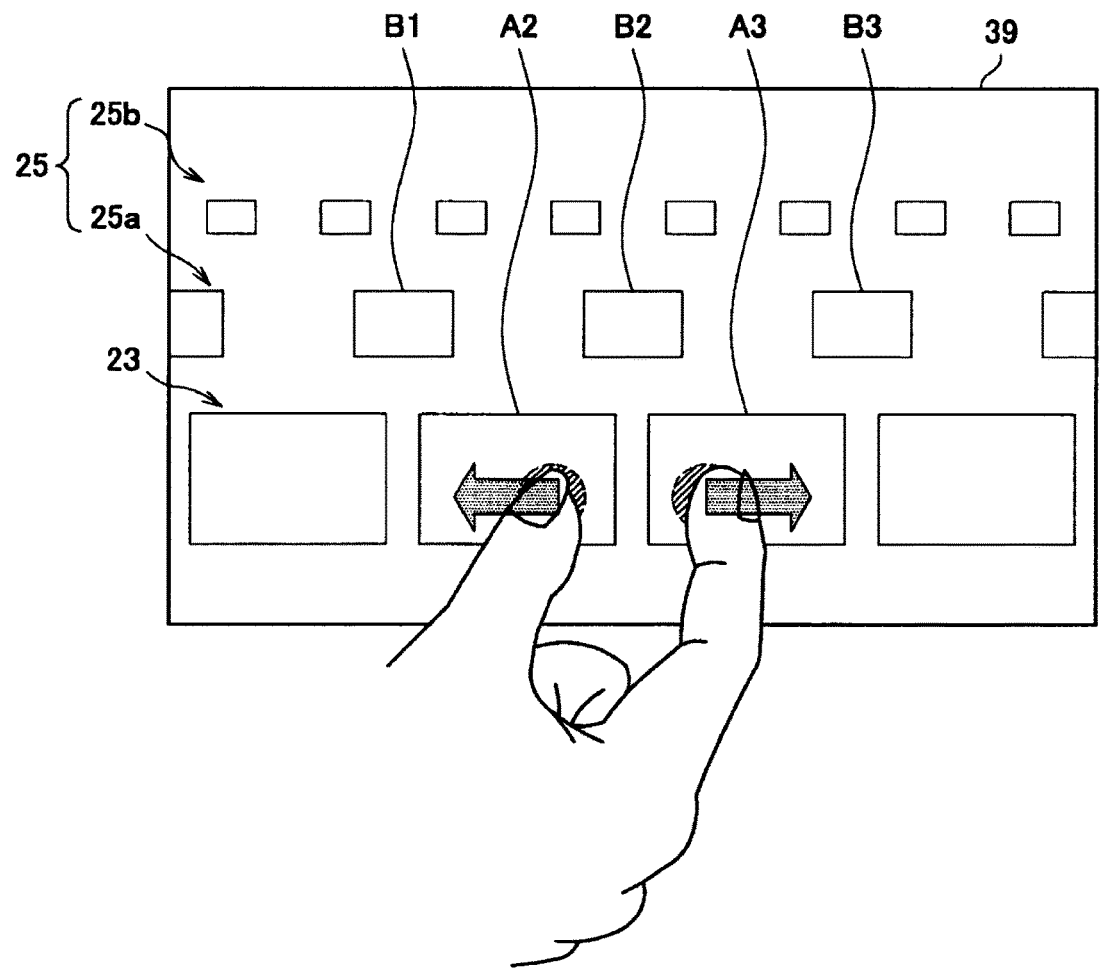
FIG. 5 is a diagram illustrating a pinch-out operation in accordance with this embodiment.

FIG. 5 is a diagram illustrating a pinch-out operation of a user. As shown in a screen 39 in FIG. 5, when a pinch-out operation on a target list 23 is detected, the GPU 112 couples lists.

Figure 6:
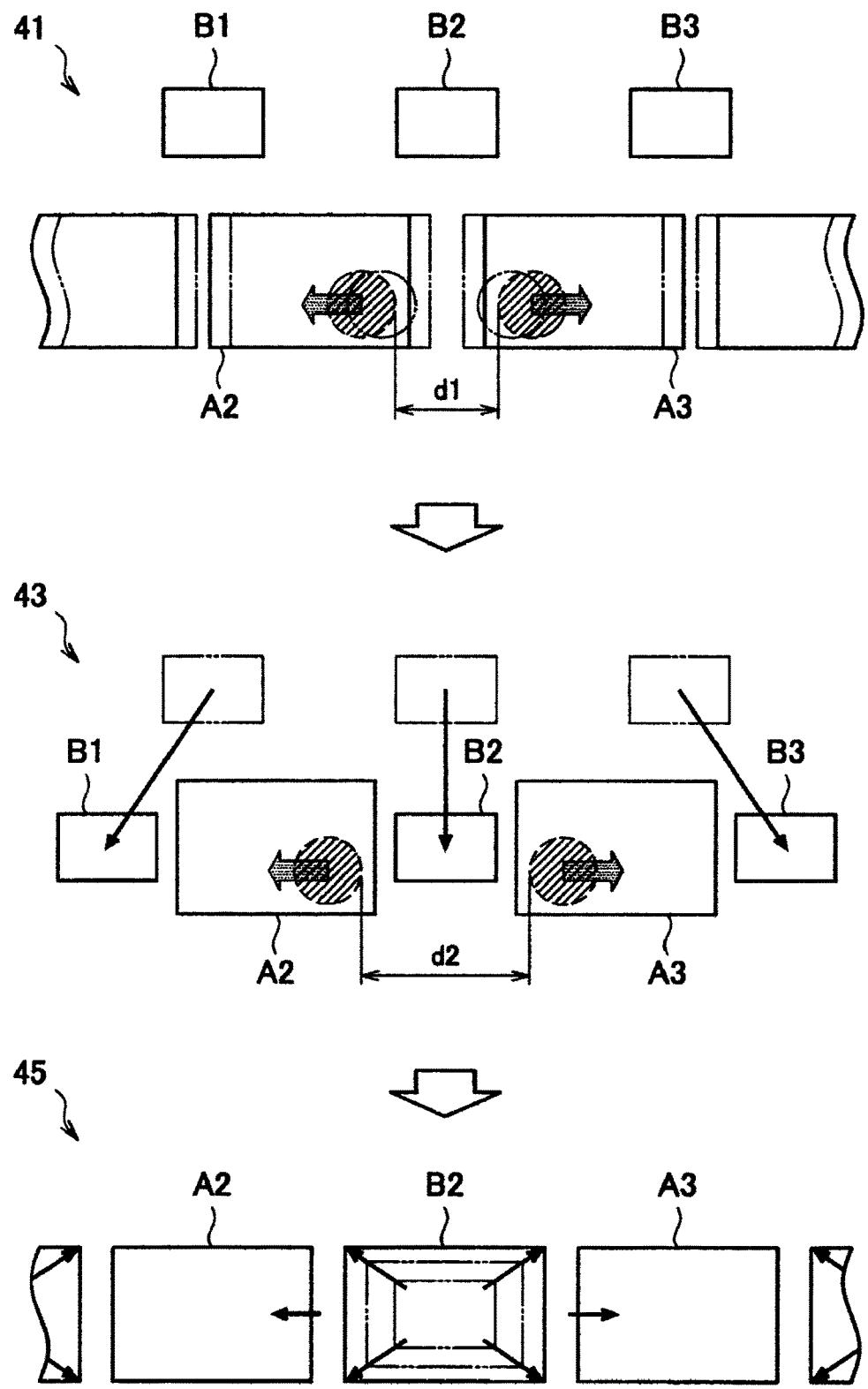
FIG. 6 is a screen transition diagram illustrating an animation when lists are coupled in conjunction with a pinch-out operation in accordance with this embodiment.

FIG. 6 is a screen transition diagram illustrating an animation when lists are coupled in conjunction with a pinch-out operation. As shown in a screen 41 in FIG. 6, with a list item A2 and a list item A3 being touched, an operation (a pinch-out operation) of widening the gap d1 between the touch positions is performed. The GPU 112 moves the display positions of the list item A2 and the list item A3 in accordance with the touch positions of the user.

Next, as shown in a screen 43, when the gap d2 between the touch positions exceeds a threshold, a list item B2 of the sub-list 25a automatically moves and is inserted into the space between the list item A2 and the list item A3. At this time, the other list items of the sub-list 25a, such as a list item B1 and a list item B3, for example, are similarly inserted into the space between each list item of the target list 23. Note that when an operation of narrowing the gap between the touch positions of the two fingers performing the pinch-out operation is detected, the GPU 112 performs display control so that the coupling of the lists is canceled and the list item B2 and the like are restored to their initial display positions.

Then, the GPU 112, as shown in a screen 45 in FIG. 6, enlarges the list item B2 inserted into the space between the list item A2 and the list item A3 to a size that is similar to the size of each list item of the target list 23, and thus completes the coupling of the lists.

As described above, the GPU 112 couples the sub-list 25 displayed on the screen to the target list 23 in accordance with a pinch-out operation to thereby increase the amount of information of the target list 23. As the sub-list 25 to be coupled is displayed on the screen, the user is able to check in advance the list items 21 of the sub-list 25 to be coupled to the target list 23.

In addition, the user is also able to cancel the coupling of the lists before the completion thereof while checking information that is increased by the coupling.

Although the example shown in FIG. 6 illustrates a view in which a single sub-list 25 is coupled, coupling of lists through a pinch-out operation in accordance with this embodiment is not limited thereto, and the GPU 112 may perform coupling at multiple levels in accordance with the magnitude of a pinch-out operation. For example, when the gap d2 between the touch positions exceeds double the width of the list item B2, the GPU 112 performs coupling at two levels. That is, the GPU 112 performs display control so that the sub-list 25a and the sub-list 25b are coupled to the target list 23.

In addition, although the aforementioned embodiment describes detecting a pinch-out operation of touching two list items of the target list 23 with two fingers and widening the gap between the fingers, the positions of the pinch-out operation in accordance with this embodiment are not limited thereto. The GPU 112, no matter at which position on the screen a pinch-out operation is detected, couples lists in accordance with the width of the gap d between the touch positions and a movement of widening the gap d with the screen being touched.

Figure 7:
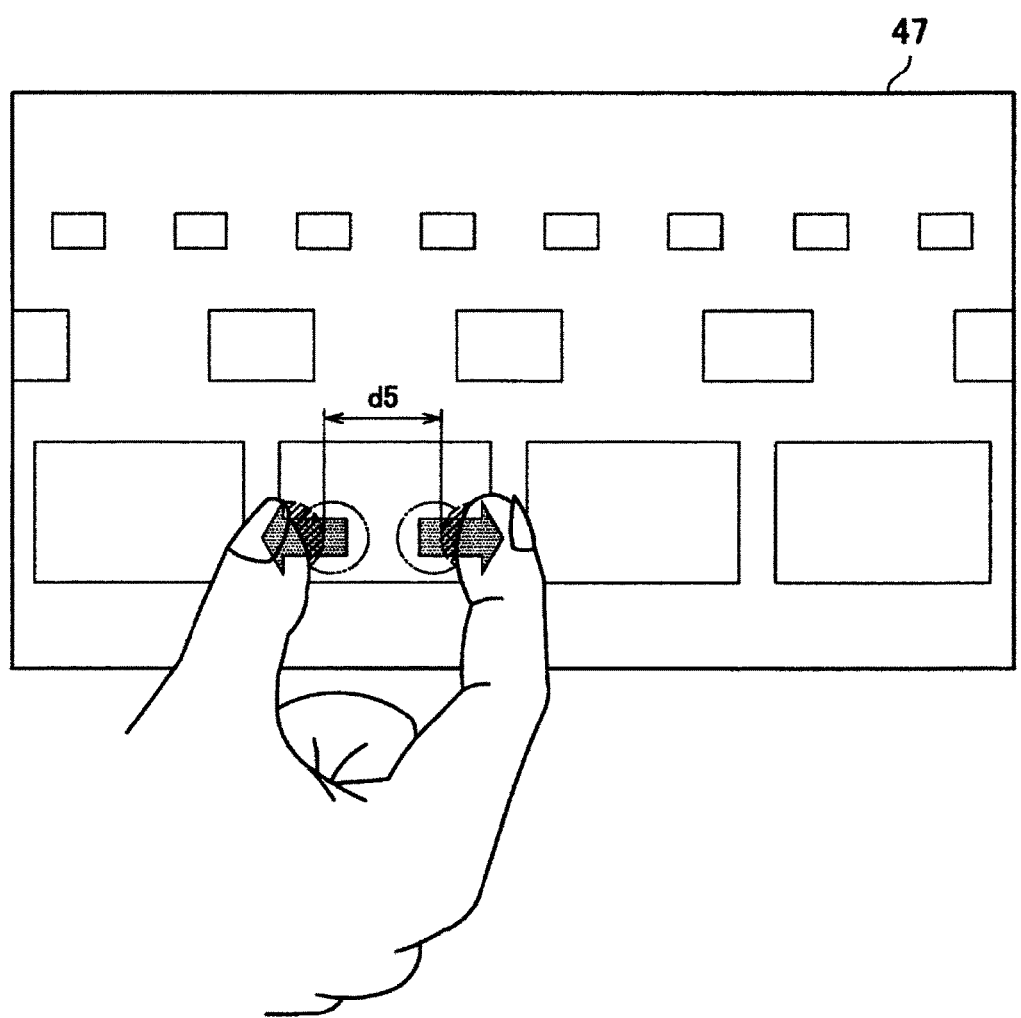
FIG. 7 is a diagram illustrating another pinch-out operation in accordance with this embodiment.

An example of application of a detection position of a pinch-out operation will be described with reference to FIG. 7. FIG. 7 is a diagram illustrating another pinch-out operation of a user. As shown in a screen 47 in FIG. 7, a user performs a pinch-out operation of widening the gap between two fingers at a given position, for example, on a single list item. Then, the GPU 112 couples lists in accordance with the distance of the widened gap d5 between the two fingers.

(Pinch-In Operation)

The GPU 112, when a pinch-in operation is detected, separates lists in accordance with the pinch-in operation. Note that a pinch-in operation refers to a touch operation of, while touching two points on a screen with two fingers, narrowing the gap between the two fingers. Hereinafter, description will be specifically made with reference to FIGS. 8 and 9.

Figure 8:
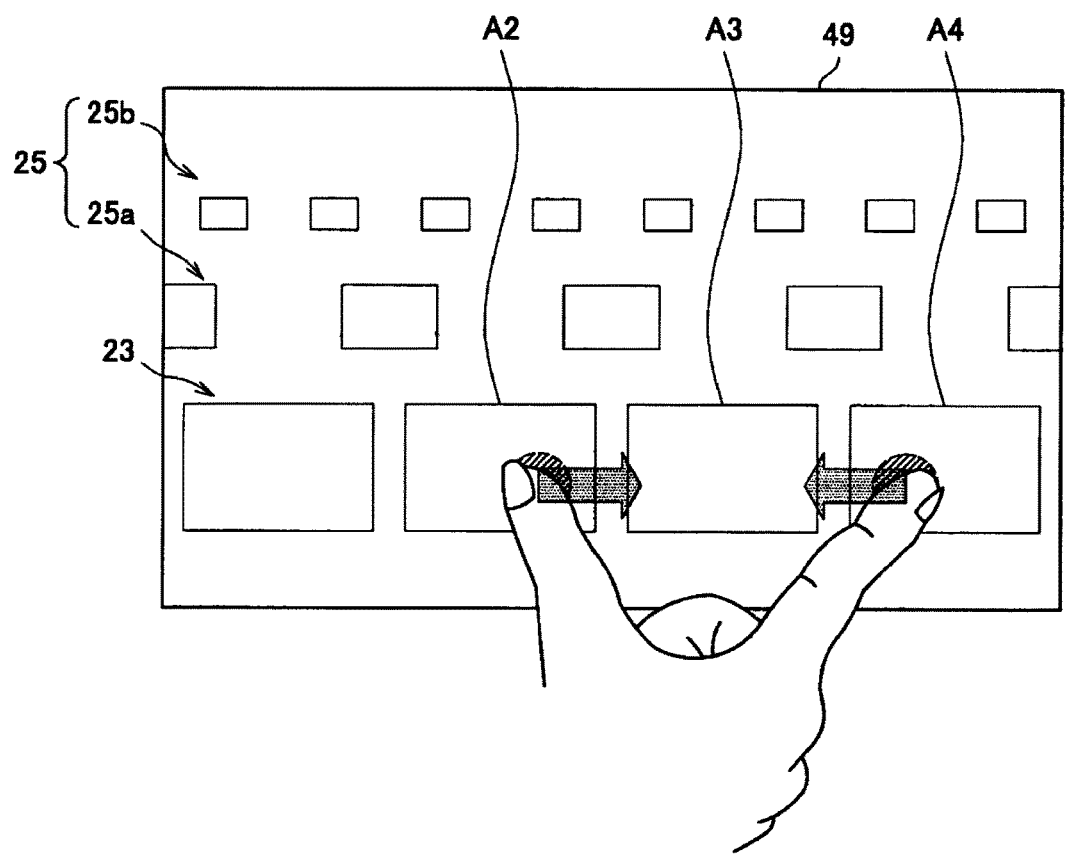
FIG. 8 is a diagram illustrating a pinch-in operation in accordance with this embodiment.

FIG. 8 is a diagram illustrating a pinch-in operation of a user. As shown in a screen 49 in FIG. 8, when a pinch-in operation on a target list 23 is detected, the GPU 112 separates lists.

FIG. 9 is screen transition diagram illustrating an animation when lists are separated in conjunction with a pinch-in operation. As shown in a screen 51 in FIG. 9, with a list item A2 and a list item A4 being touched, an operation (a pinch-in operation) of narrowing the gap d3 between the touch positions is performed. The GPU 112 moves the display positions of the list item A2 and the list item A4 so that they move closer to each other in accordance with the touch positions of the user. In addition, the GPU 112 displays the list item A3 so that the list item A3 gradually shrinks in accordance with the pinch-in operation.

Next, as shown in a screen 53, when the gap d4 between the touch positions exceeds a threshold, the GPU 112 performs display control so that the list item A3 is moved away from and separated from the target list 23. At this time, the other list items of the target list 23, for example, every other list item arranged in the target list 23, such as a list item A1 and a list item A5, automatically moves and is thus separated. Note that when an operation of widening the gap between the touch positions of the two fingers performing the pinch-in operation is detected, the GPU 112 performs display control so that the separation of the list is canceled and the list item A3 and the like are restored to their initial display positions.

Then, the GPU 112, as shown in a screen 55 in FIG. 9, creates a new sub-list 25x by arranging the list items A1, A3, and A5 separated from the target list 23. In addition, the GPU 112, as shown in the screen 55, adjusts the display position of each list item of a target list 23x whose number of list items has been decreased by the separation of the list.

As described above, the GPU 112 separates a predetermined number of list items from the target list 23 displayed on the screen in accordance with a pinch-in operation, and creates the new sub-list 25x by arranging the predetermined number of the separated list items.

As the list items separated from the target list 23 gradually shrink, the user is able to check in advance which list items are to be separated before the completion of the separation.

In addition, the user is also able to cancel the separation of the list before the completion thereof while checking information of the target list 23 that is decreased by the separation.

Although the example shown in FIG. 9 illustrates a view in which one more new sub-list 25x is created, separation of a list through a pinch-in operation in accordance with this embodiment is not limited thereto, and the GPU 112 may newly create a plurality of sub-lists 25 in accordance with a pinch-in operation. For example, if a pinch-in operation is performed when the gap d3 between the touch positions is double the width of a list item, the GPU 112 newly creates two sub-lists 25.

In addition, although the aforementioned embodiment describes detecting a pinch-in operation of, while touching two list items of the target list 23 with two fingers, narrowing the gap between the fingers, the positions of the pinch-in operation in accordance with this embodiment are not limited thereto. The GPU 112, no matter at which position on the screen a pinch-in operation is detected, separates a list in accordance with the width of the gap d between the touch positions and a movement of narrowing the gap d with the screen being touched.

(Drag Operation)

Next, a case in which the GPU 112 couples/separates lists in accordance with a drag operation will be described. Note that a drag operation refers to a touch operation of moving a finger while touching one point on a screen with the finger. Hereinafter, coupling of lists performed in conjunction with a drag operation will be described with reference to FIGS. 10 and 11.

Figure 10:
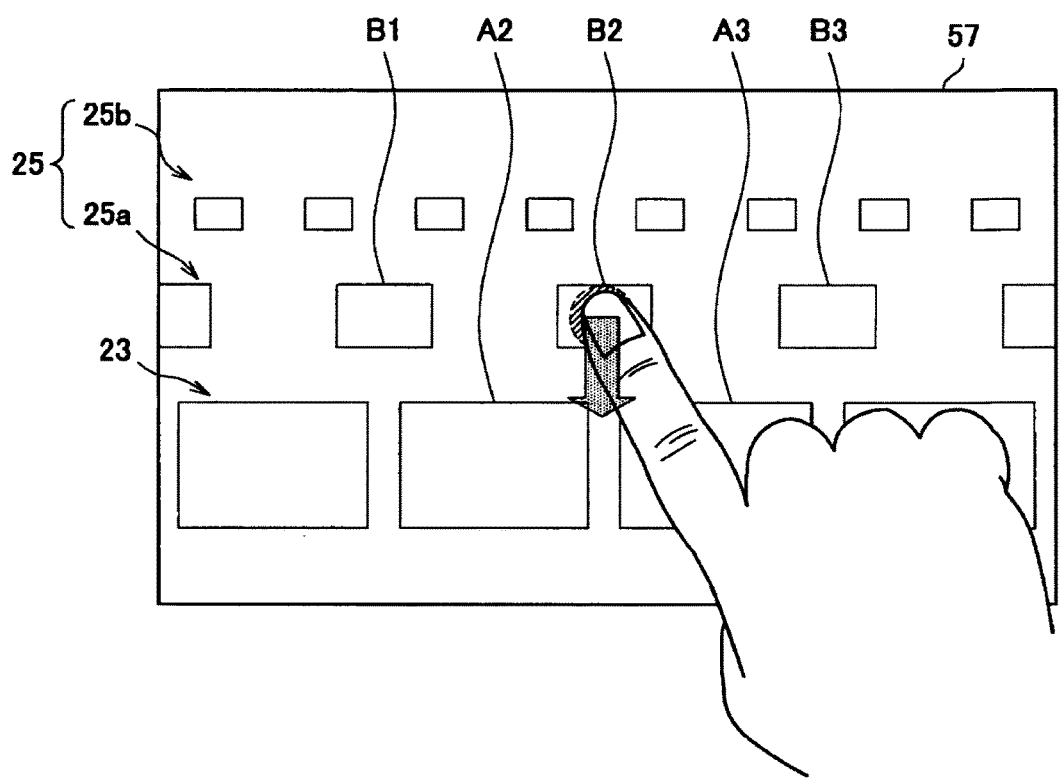
FIG. 10 is a diagram illustrating a drag operation in accordance with this embodiment.

FIG. 10 is a diagram illustrating a drag operation of a user. As shown in a screen 57 in FIG. 10, when a drag operation of moving a list item B2 of a sub-list 25a to a target list 23 is detected, the GPU 112 couples the lists.

FIG. 11 is a screen transition diagram illustrating an animation when lists are coupled in conjunction with a drag operation. As shown in a screen 61 in FIG. 11, the GPU 112 moves the list item B2 in a downward direction in accordance with a drag operation, and also moves the other list items B1 and B3 of the operation target sub-list 25a in a downward direction. In addition, the GPU 112 performs display control so that as the list item B2 moves closer to the target list 23, the space between each list item of the target lists 23 widens.

Next, as shown in a screen 63 in FIG. 11, a user drags the list item B2 to the widened space between each list item of the target lists 23, and then lifts the touching finger off the screen.

Herein, the GPU 112 may accept cancelation of the coupling of the lists until the list item B2 is dragged to a predetermined position in the target list 23. For example, when a drag operation of moving the list item B2 back in an upward direction in the touched state is detected, the GPU 112 performs display control so that the position of each list item is restored to the initial position.

Then, as shown in a screen 65 in FIG. 11, the GPU 112 enlarges the list item B2 dragged to a position in the target list 23 so that the size of the list item B2 becomes similar to that of each list item of the target list 23, and thus completes the coupling of the lists.

As described above, the GPU 112, in accordance with a drag operation, couples the sub-list 25 displayed on the screen to the target list 23 and increases the amount of information of the target list 23. As the sub-list 25 to be coupled is displayed on the screen, the user is able to check in advance the list items 21 of the sub-list 25 to be coupled to the target list 23.

In addition, the user is also able to cancel the coupling of the lists before the completion thereof while checking information that is increased by the coupling.

Coupling of lists through a drag operation has been described above. Next, separation of a list through a drag operation will be described.

The GPU 112, when an operation of dragging a list item of the target list 23 in an upward direction is detected, separates the list. As an animation when a list is separated, for example, when the list item A2 is dragged in an upward direction, the GPU 112 displays the list item A2 so that it gradually becomes smaller. In addition, the GPU 112 simultaneously displays the other list items A to be separated from the target list 23 so that they gradually become smaller while moving them in an upward direction.

In addition, the GPU 112 arranges each of the remaining list items of the target list 23 whose number of list items has been decreased by the separation of the list so that the space between each list item becomes narrower.

In addition, the GPU 112 creates a new sub-list by arranging the list items separated from the target list 23 so that they are aligned above the target list 23, whereby separation of the list is completed.

Coupling/separation of lists through a drag operation have been described above. Such coupling/separation of lists are performed by moving a single list item through a drag operation. However, it is also possible to move a single list item through a flick operation instead of a drag operation. Hereinafter, coupling/separation of lists performed in conjunction with a flick operation will be described.

(Flick Operation)

A flick operation refers to a touch operation of, while touching one point on a screen with a finger, lightly sweeping the finger in one direction. The GPU 112 couples/separates lists through a flick operation.

An animation when lists are coupled through a flick operation is roughly similar to the animation when lists are coupled through a drag operation described with reference to FIG. 11. For example, when an operation of touching the list item B2 of the sub-list 25 with a finger and sweeping the finger in a downward direction is detected, the GPU 112 moves each list item of the sub-list 25a in a downward direction. In addition, the GPU 112 performs display control so that the space between each list item of the target list 23 widens.

Then, each list item of the sub-list 25a moves to the widened space between each list item of the target list 23. The GPU 112 enlarges each of the moved list items of the sub-list 25a to a size that is similar to the size of each list item of the target list 23, whereby coupling of the lists is completed.

Note that when the GPU 112 moves the list item B2 in accordance with the flick speed of the user, there may be cases in which the list item B2 may not reach a point in the target list 23 depending on the flick speed. In such cases, the GPU 112 may perform display control so that the display position of each list item is restored to the initial position.

Coupling of lists through a flick operation has been described above. Next, separation of a list through a flick operation will be described.

The GPU 112, when an operation of flicking a list item of the target list 23 in an upward direction is detected, separates the list. As an animation when a list is separated, for example, when the list item A2 is flicked in an upward direction, the GPU 112 moves the list item A2 in an upward direction while gradually displaying the list item A2 in smaller size. At the same time, the GPU 112 also gradually displays the other list items A separated from the target list 23 in smaller size while moving them in an upward direction.

The GPU 112 arranges each of the remaining list items of the target list 23 whose number of list items has been decreased by the separation of the list so that the space between each list item becomes narrower.

Then, the GPU 112 creates a new sub-list by aligning the list items separated from the target list 23 above the target list 23, whereby separation of the list is completed.

(Tap/Double-Tap Operation)

In addition, the GPU 112 may couple/separate lists in conjunction with a tap/double-tap operation. For example, each of the tapped/double-tapped list items of the sub-list 25a is moved to the space between each list item of the target list 23 as shown in FIG. 4, whereby coupling of the lists is completed.

Meanwhile, when a tap/double-tap operation is performed on the target list 23, the GPU 112 separates a predetermined number of list items from the target list 23 to thereby reduce the amount of information of the target list 23. Then, the GPU 112 creates a new sub-list by arranging the list items separated from the target list 23, whereby separation of the list is completed.

(Button/Bar Operation)

The GPU 112 may also couple/separate lists in response to a user operation on a button or a bar. Hereinafter, description will be specifically made with reference to FIGS. 12 and 13.

Figure 12:
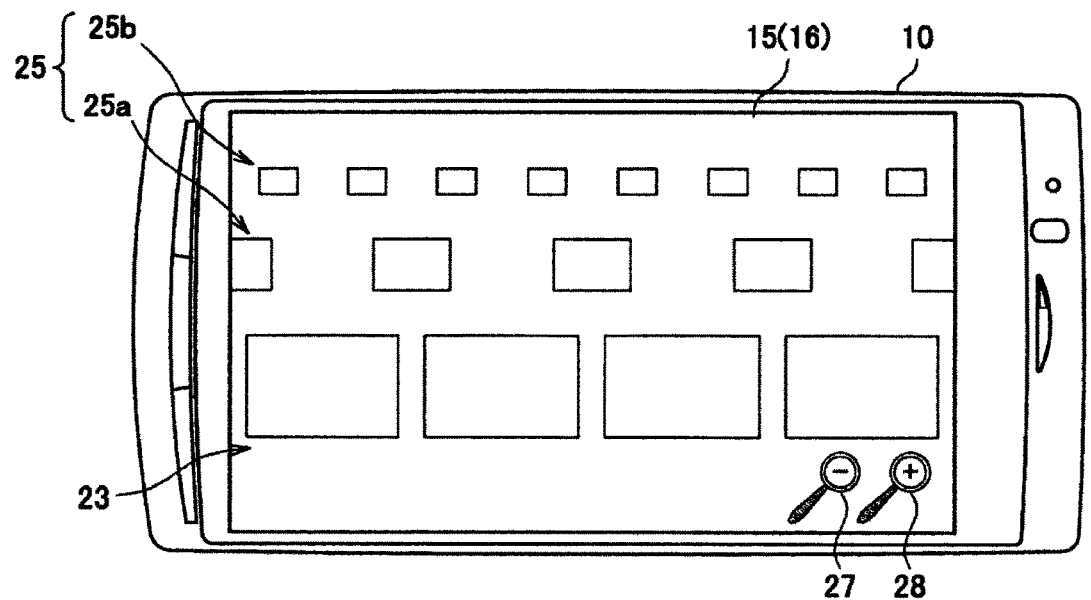
FIG. 12 is a diagram illustrating a scale-out button and a scale-in button in accordance with this embodiment.

FIG. 12 is a diagram showing a scale-out button 27 and a scale-in button 28. When a user operation on the scale-out button 27 shown in FIG. 12 is detected, the GPU 112 separates a predetermined number of list items from the target list 23, and creates a new sub-list 25 by arranging the separated list items, whereby separation of the list is completed.

Meanwhile, when a user operation on the scale-in button 28 shown in FIG. 12 is detected, the GPU 112 moves each list item of the sub-list 25 to the space between each list item of the target list 23, and adjusts the size of each moved list item, whereby coupling of the lists is completed.

Figure 13:
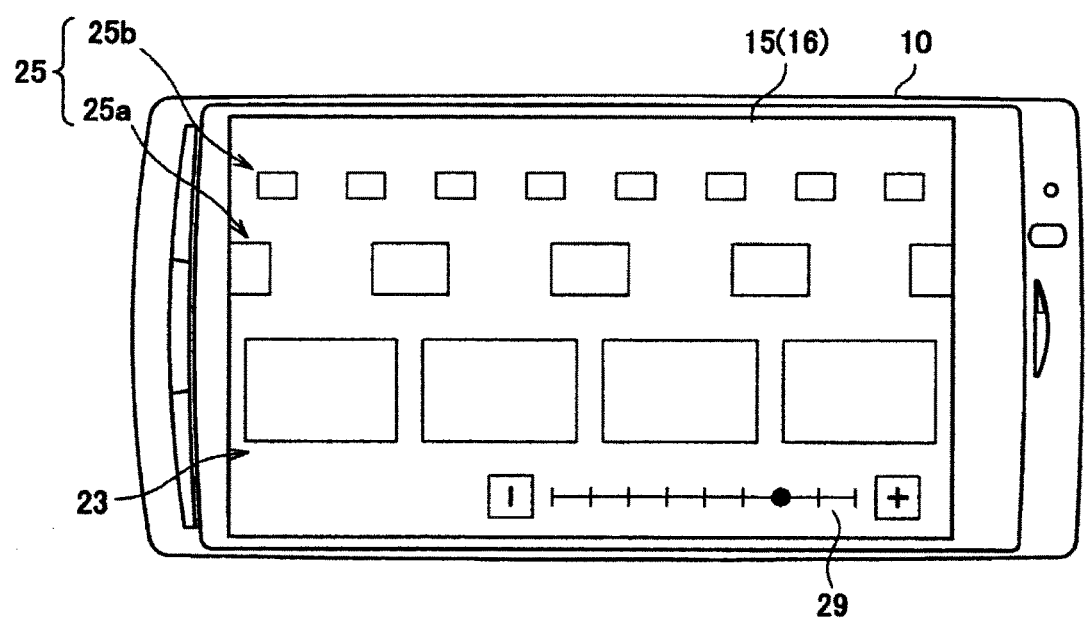
FIG. 13 is a diagram showing a slider bar in accordance with this embodiment.

FIG. 13 is a diagram showing a slider bar 29. When a user operation of moving a knob of the slider bar 29 shown in FIG. 13 in the "−" direction is detected, the GPU 12 separates a predetermined number of list items from the target list 23. Then, the GPU 112 creates a new sub-list 25 by arranging the separated list items, whereby separation of the list is completed.

Meanwhile, when a user operation of moving the knob of the slider bar 29 shown in FIG. 13 in the "+" direction is detected, the GPU 112 moves each list item of the sub-list 25 to the space between each list item of the target list 23, and adjusts the size of each moved list item, whereby coupling of the lists is completed.

Note that the GPU 112 reduces the amount of information of the target list 23, which is changed by coupling/separation of lists, as the knob of the slider bar 29 moves closer to the "minus" sign, and increases the amount (increases the fragmentation level) of the information of the target list 23 as the knob of the slider bar 29 moves closer to the "plus" sign.

Coupling/separation of a plurality of lists performed in conjunction with a user operation have been described in detail. Next, another method of displaying such plurality of lists will be described.

[2-4. Other Exemplary Displays of Plurality of Lists]

In the example shown in FIG. 1, the GPU 112 displays a plurality of lists, each of which has list items 21 arranged in the horizontal direction, in the vertical direction in a stepwise manner. However, the method of displaying a plurality of lists in accordance with this embodiment is not limited to the example shown in FIG. 1. Hereinafter, another example of displaying a plurality of lists will be described with reference to FIGS. 14 and 15.

Figure 14:
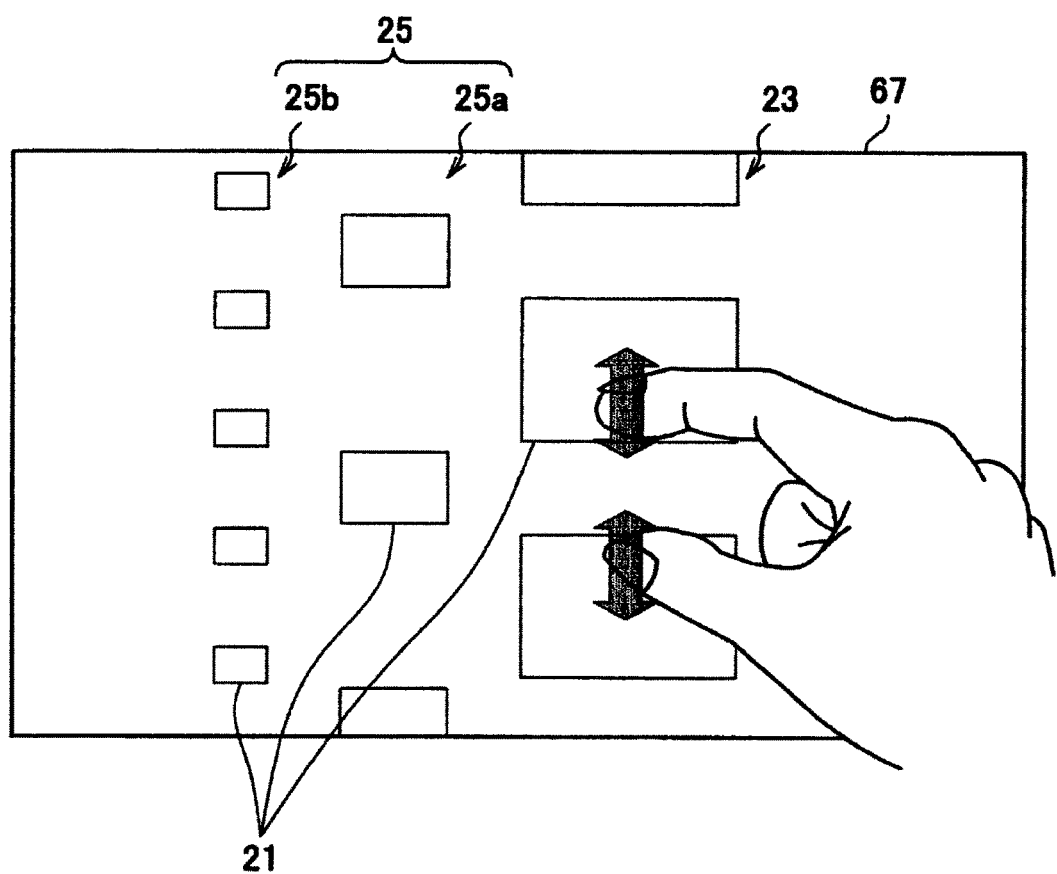
FIG. 14 is a diagram showing an exemplary display in which a plurality of lists are arranged vertically in accordance with this embodiment.

FIG. 14 is a diagram showing an exemplary display in which a plurality of lists are arranged vertically. As shown in FIG. 14, the GPU 112 arranges a plurality of lists, each of which has list items 21 arranged in the vertical direction, in the horizontal direction in a stepwise manner. In this case, when a pinch-out/in operation on the target list 23 is detected, for example, the GPU 112 couples/separates lists.

Figure 15:
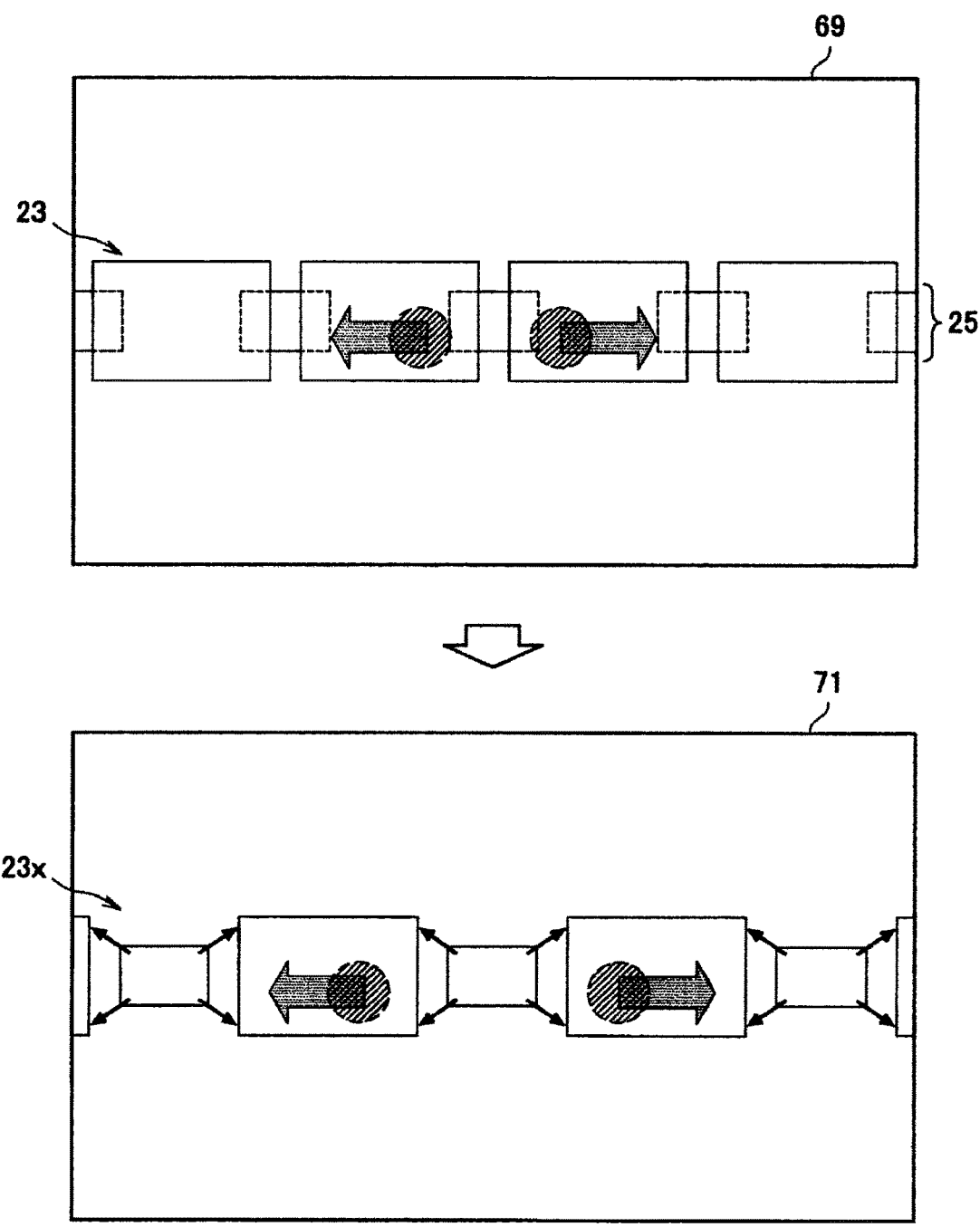
FIG. 15 is a diagram showing an exemplary display in which a plurality of lists overlap in accordance with this embodiment.

FIG. 15 is a diagram showing an exemplary display in which a plurality of lists overlap. As shown in a screen 69 in FIG. 15, the GPU 112 displays a target list 23 such that it overlaps a sub-list 25. A user is able to check each list item of the sub-list 25 between each list item of the target list 23.

When a pinch-out operation on the target list 23 displayed in this manner is detected, the GPU 112 moves each list item of the target list 23 in the horizontal direction in accordance with the pinch-out operation as shown in a screen 71 in FIG. 15. At the same time, the GPU 112 also performs control such that each list item of the sub-list 25 is gradually enlarged, thereby displaying a target list 23$x$ with the sub-list 25 coupled thereto.

[2-5. Change of Displayed Information]

Next, how the displayed information of lists is changed by coupling/separation of the lists will be described. As described above, when lists are coupled, the number of list items of the target list 23 increases, and when a list is separated, the number of list items of the target list 23 decreases. Such a change in the displayed information of the target list 23 in accordance with a change in the number of list items (the amount of information) will be hereinafter described in detail with reference to a specific example.

FIRST EXAMPLE

Granularity of Information

Figure 16:
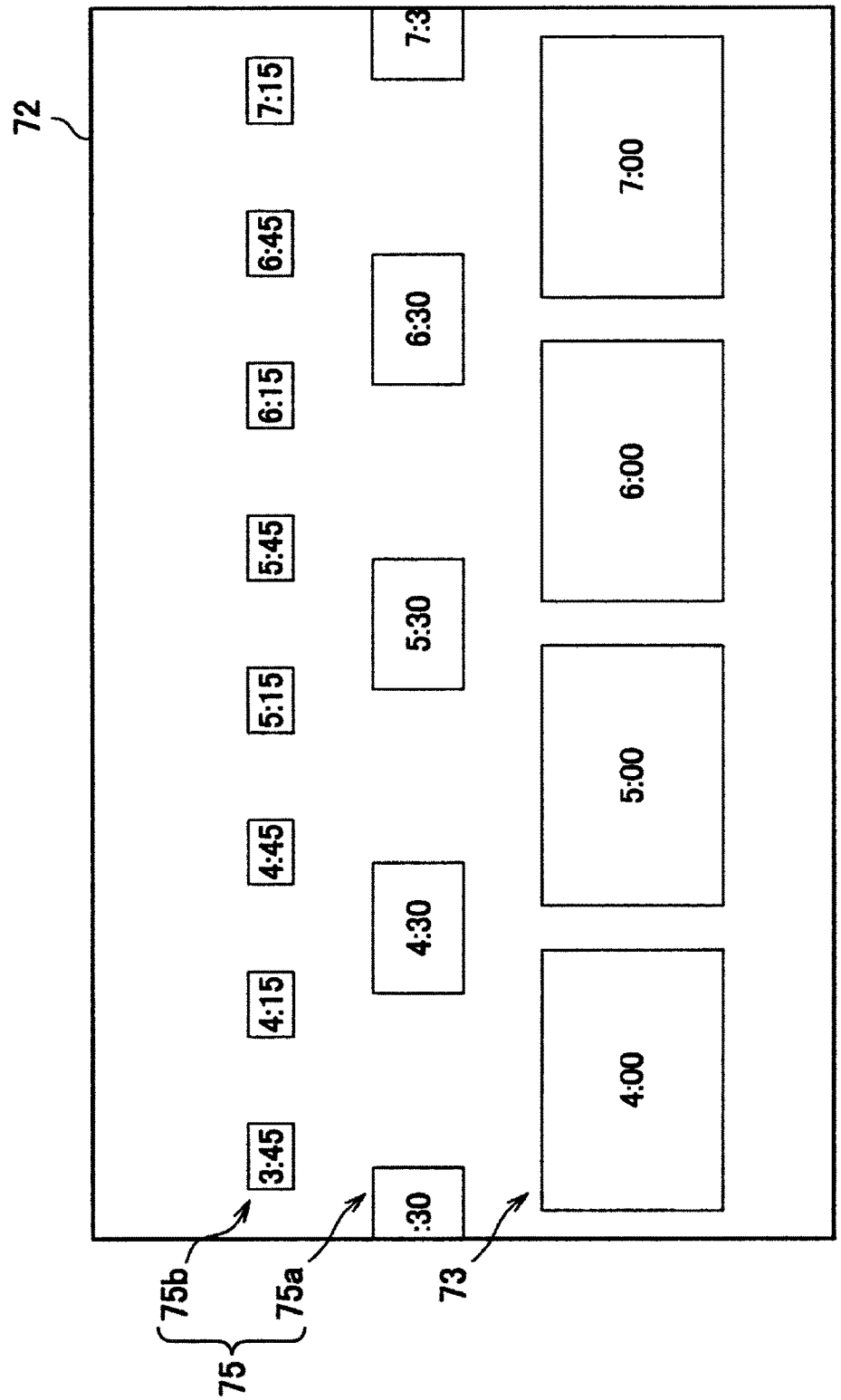
FIG. 16 is a diagram showing a screen on which a plurality of lists each including a plurality of thumbnail images are displayed in accordance with this embodiment.
Figure 17:
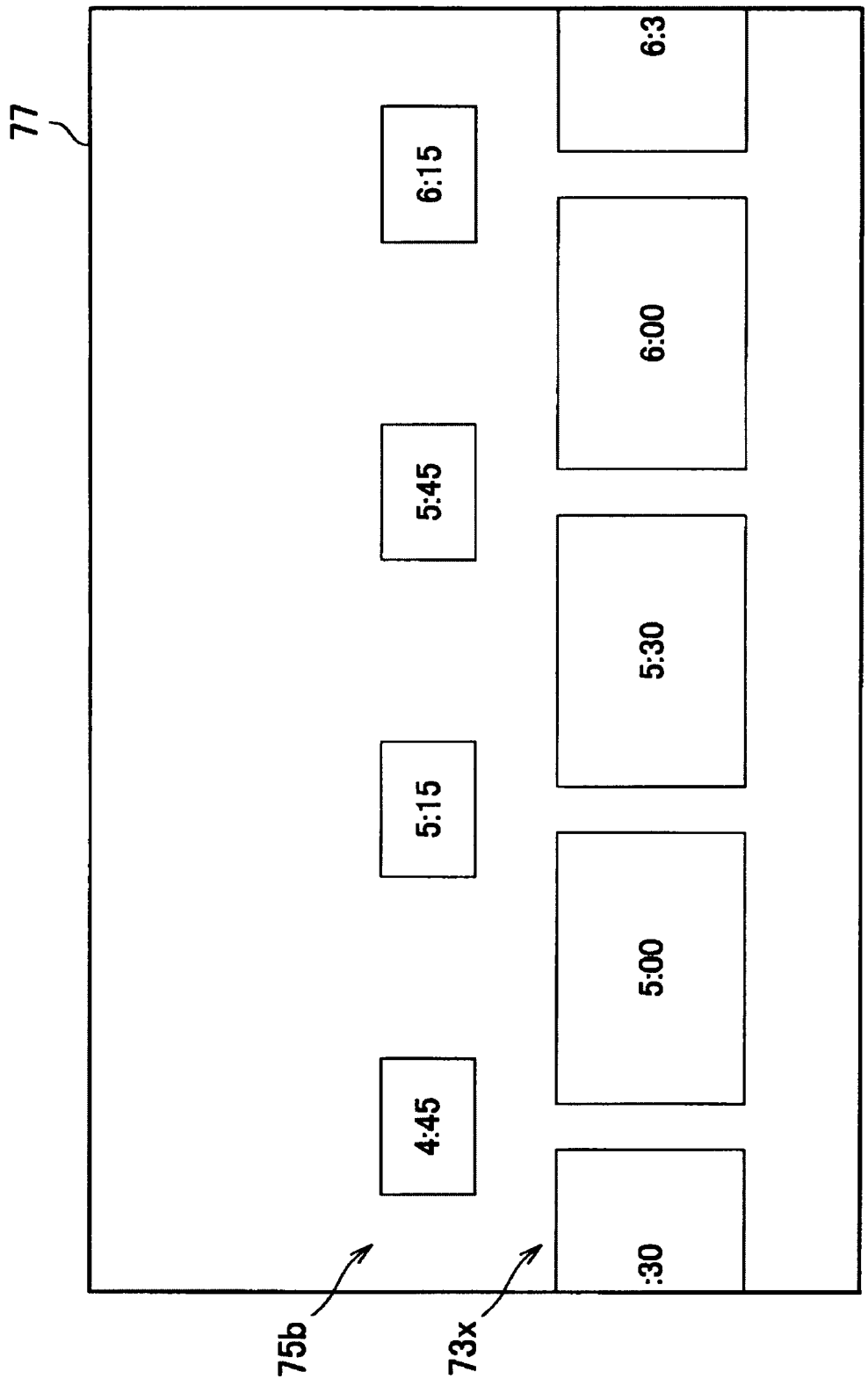
FIG. 17 is a diagram showing a result obtained when the plurality of lists shown in FIG. 16 are coupled.
Figure 18:
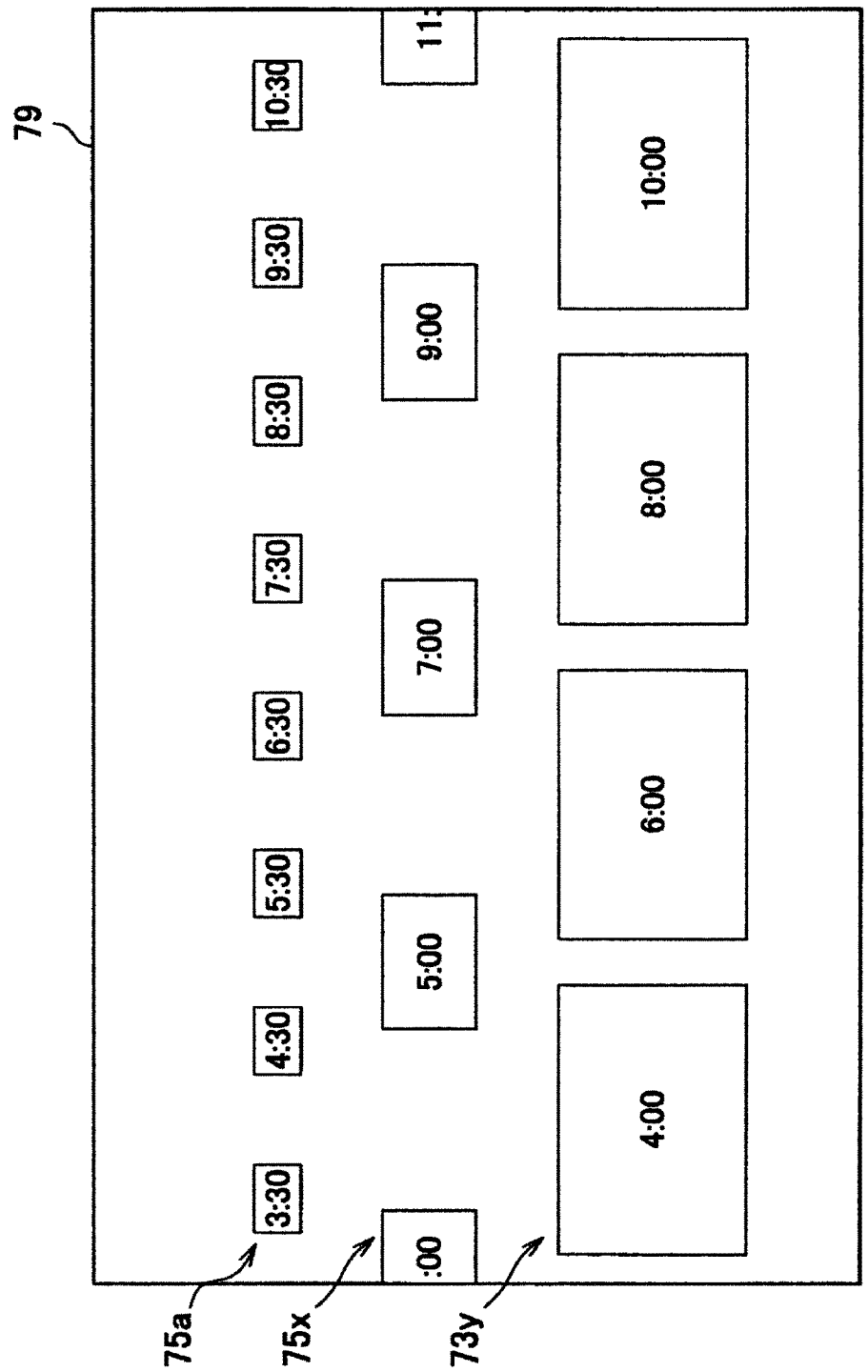
FIG. 18 is a diagram showing a result obtained when the plurality of lists shown in FIG. 16 are separated.

As a first example, when the number of list items of the target list 23 increases, the granularity of information becomes finer, and when the number of list items of the target list 23 decreases, the granularity of information becomes coarser. The granularity of information will be specifically described with reference to FIG. 16 to FIG. 18. FIGS. 16 to 18 exemplarily illustrate thumbnail images, which are created from scenes of moving image data of every predetermined time period, as list items.

FIG. 16 is a diagram showing a screen 72 that displays a plurality of lists each including a plurality of thumbnail images. As shown in FIG. 16, a target list 73 is a list having arranged therein scenes of moving image data of every minute.

In addition, as shown in FIG. 16, a sub-list 75$a$ is a list having arranged therein scenes, each of which is to be interpolated between the scenes of the target list 73 of every minute. For example, the sub-list 75$a$ includes arranged therein a thumbnail image of 4:30 to be interpolated between a thumbnail image of 4:00 and a thumbnail image of 5:00 of the target list 73, a thumbnail image of 5:30 to be interpolated between a thumbnail image of 5:00 and a thumbnail image of 6:00 of the target list 73, a thumbnail image of 6:30 to be interpolated between a thumbnail image of 6:00 and a thumbnail image of 7:00 of the target list 73, and the like.

In addition, as shown in FIG. 16, a sub-list 75$b$ is a list having arranged therein scenes, every two of which are to be interpolated between the scenes arranged in the sub-list 75$a$. For example, thumbnail images of 4:45 and 5:15 to be interpolated between the thumbnail image of 4:30 and the thumbnail image of 5:30 of the sub-list 75$a$ are arranged.

Then, when a user operation indicating coupling of the plurality of lists shown in FIG. 16 is detected, the GPU 112 couples the sub-list 75$a$ to the target list 73, whereby the number of list items of the target list 73 increases. A case in which the number of list items of the target list 73 shown in FIG. 16 increases will be described with reference to FIG. 17.

FIG. 17 is a diagram showing a result obtained when the plurality of lists shown in FIG. 16 are coupled. A target list 73$x$ shown in FIG. 17 is obtained by coupling the sub-list 75$a$ to the target list 73 shown in FIG. 16. Through the coupling of the lists, the number of list items of the target list 73$x$ increases, so that thumbnail images of every 30 seconds are arranged. As described above, when the number of list items is increased by the coupling of the lists, the granularity of information becomes finer.

FIG. 18 is a diagram showing a result obtained when the plurality of lists shown in FIG. 16 are separated. A target list 73$y$ shown in FIG. 18 is obtained by separating a list from the target list 73 shown in FIG. 16. In addition, a sub-list 75$x$ shown in FIG. 18 is a sub-list that is newly created by arranging the list items separated from the target list 73 shown in FIG. 16. By the separation of the list, the number of list items of the target list 73$y$ decreases, so that thumbnail images of every two minutes are arranged. As described above, when the number of list items is decreased by the separation of the list, the granularity of information becomes coarser.

SECOND EXAMPLE

Types of Information

Figure 19:
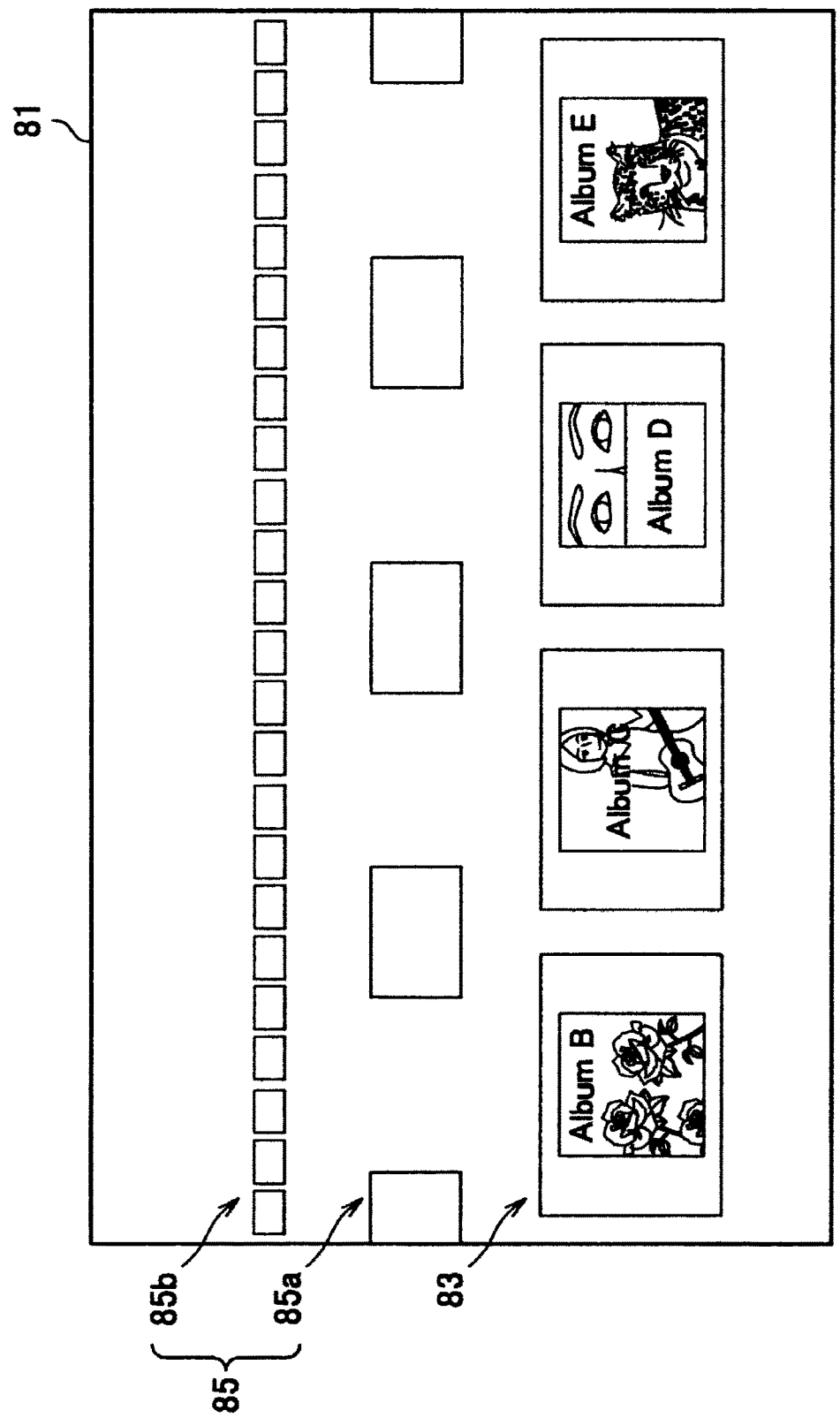
FIG. 19 is a diagram showing a screen that displays a plurality of lists created on the basis of information related to music data in accordance with this embodiment.
Figure 20:
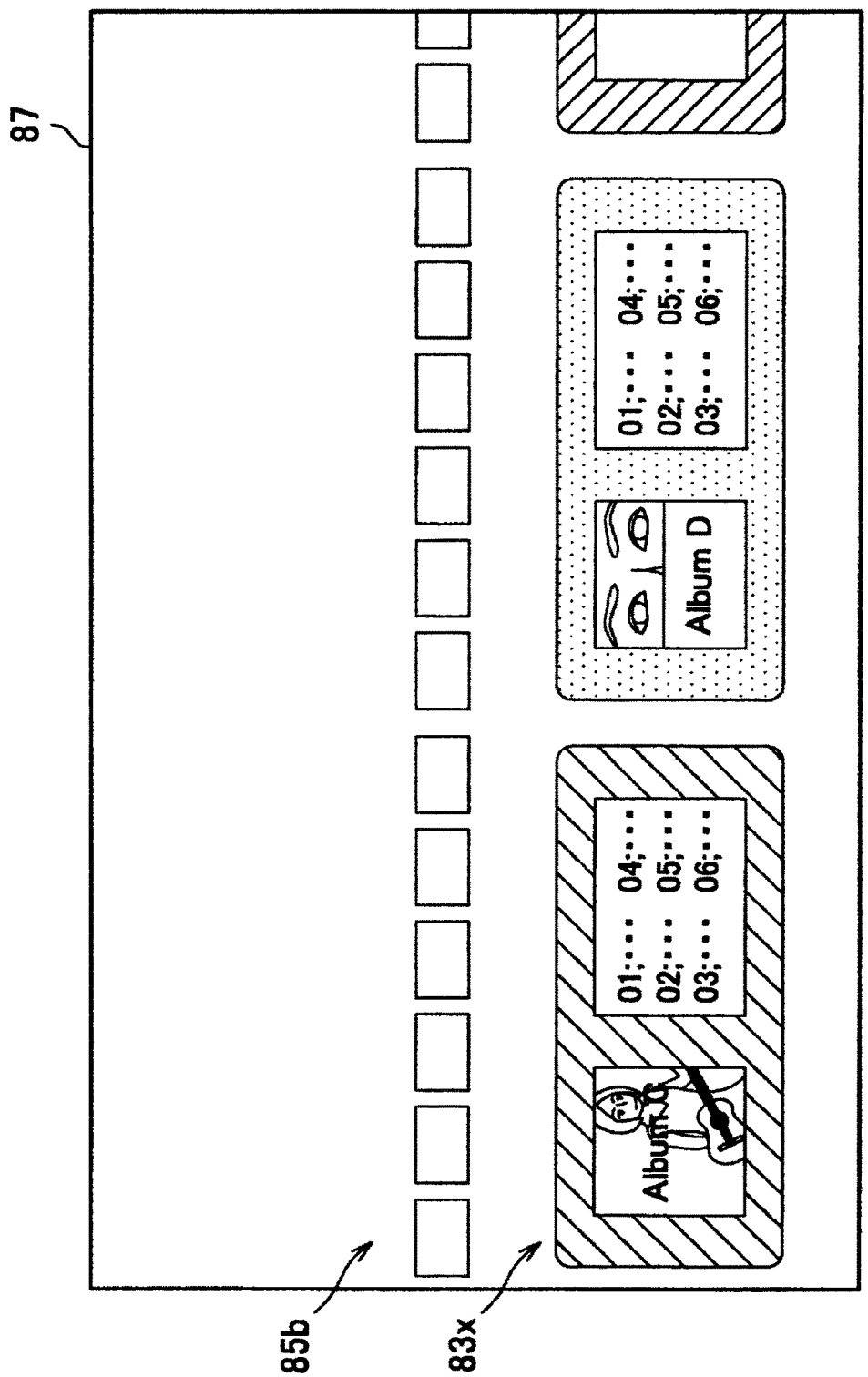
FIG. 20 is a diagram showing a result obtained when the plurality of lists shown in FIG. 19 are coupled.
Figure 21:
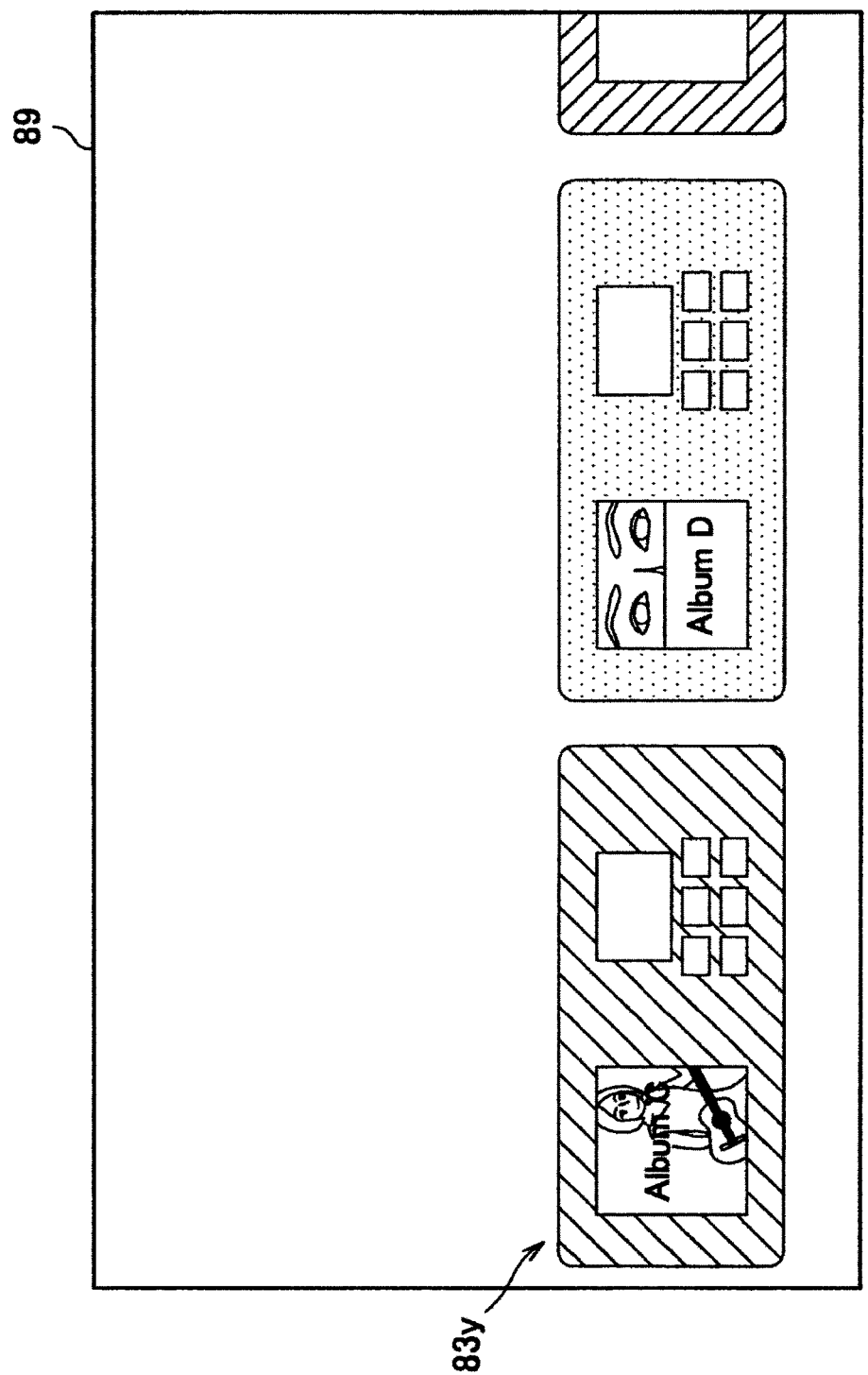
FIG. 21 is a diagram showing a result obtained when two sub-lists shown in FIG. 19 are coupled to a target list.

As a second example, when the number of list items of the target list 23 increases, the types of information increase, and when the number of list items of the target list 23 decreases, the types of information decrease. The types of information will be specifically described with reference to FIGS. 19 and 21. FIGS. 19 to 21 exemplarily illustrate the types of information related to music data, as list items.

FIG. 19 is a diagram showing a screen 81 that displays a plurality of lists created on the basis of information related to music data. As shown in FIG. 19, a target list 83 is a list having arranged therein jacket images of music albums.

A sub-list 85$a$ is a list having arranged therein a list of names of music pieces on each music album. In addition, a sub-list 85$b$ is a list having arranged therein the lyrics of each music piece.

When a user operation indicating coupling of the plurality of lists shown in FIG. 19 is detected, the GPU 112 couples the sub-list 85$a$ to the target list 83, whereby the number of list items of the target list 83 increases. A case in which the number of list items of the target list 83 shown in FIG. 19 increases will be described with reference to FIG. 20.

FIG. 20 is a diagram showing a result obtained when the plurality of lists shown in FIG. 19 are coupled. A target list 83$x$ shown in FIG. 20 is obtained by coupling the sub-list 85$a$ to the target list 83 shown in FIG. 19. By the coupling of the lists, the number of list items of the target list 83$x$ is increased, and images of music jackets and lists of music pieces are arranged. As described above, when the number of list items is increased by the coupling of lists, the types of information increase.

Note that as shown in FIG. 20, the GPU 122 may change the background for each related information (a list item) in the target list 83$x$.

FIG. 21 is a diagram showing a result obtained when the two sub-lists 85 shown in FIG. 19 are coupled to the target list. A target list 83$y$ shown in FIG. 21 is obtained by coupling the sub-list 85$a$ and the sub-list 85$b$ to the target list 83 shown in FIG. 19. By the coupling of the lists, the number of list items of the target list 83$y$ is increased, and images of music jackets, lists of music pieces, and the lyrics of each music piece are arranged. As described above, as the number of list items is increased by the coupling of lists, the types of information increase.

Note that in the example shown in FIG. 21, the background may also be changed for each related information (list item) in the target list 83y. In addition, as shown in FIG. 21, the GPU 112 may also couple each of the sub-list 85a and the sub-list 85b to the target list 83 without changing the display size of each list item of the sub-list 85a and the sub-list 85b.

The types of information are not limited to the types of information related to music data given as an example in FIGS. 19 and 21. For example, the types of information may be classified in a stepwise manner in accordance with the degree of enthusiasm of each scene of moving image data. Specifically, the control unit 11 analyzes moving image data in advance, and the GPU 112 creates a first list by arranging thumbnail images of a scene with the highest degree of enthusiasm. Then, the GPU 112 adds a scene with the next highest degree of enthusiasm to the first list through coupling.

The above-described change in the displayed information associated with the coupling/separation of a plurality of lists also holds true for the <3. Coupling/Separation of List Items of Single List>.

3. Coupling/Separation of List Items of Single List

As described above, the GPU 112 in accordance with this embodiment may also display a single list and couple/separate list items of the list in response to a user operation. The GPU 112 increases the number of list items of the displayed single list in response to a user operation indicating coupling of lists.

In addition, the GPU 112, in response to a user operation indicating separation of a list, decreases the number of list items of the displayed single list, and creates a new sub-list by arranging the list items separated from the single list.

Herein, examples of a user operation indicating coupling/separation of list items of a single list include a pinch-out/in operation, a tap/double-tap operation, and a button/bar operation described in [2-3. User Operation]. For specific control of the coupling/separation of list items of a single list described below, a case in which a pinch-out/in operation is detected as a user operation will be exemplarily described.

[3-1. Coupling of List Items of Single List]

The GPU 112, in response to a user operation indicating coupling of lists, causes new list items to gradually appear in the list to thereby increase the number of list items. Hereinafter, coupling of list items of a single list will be described with reference to FIGS. 22 and 23.

Figure 22:
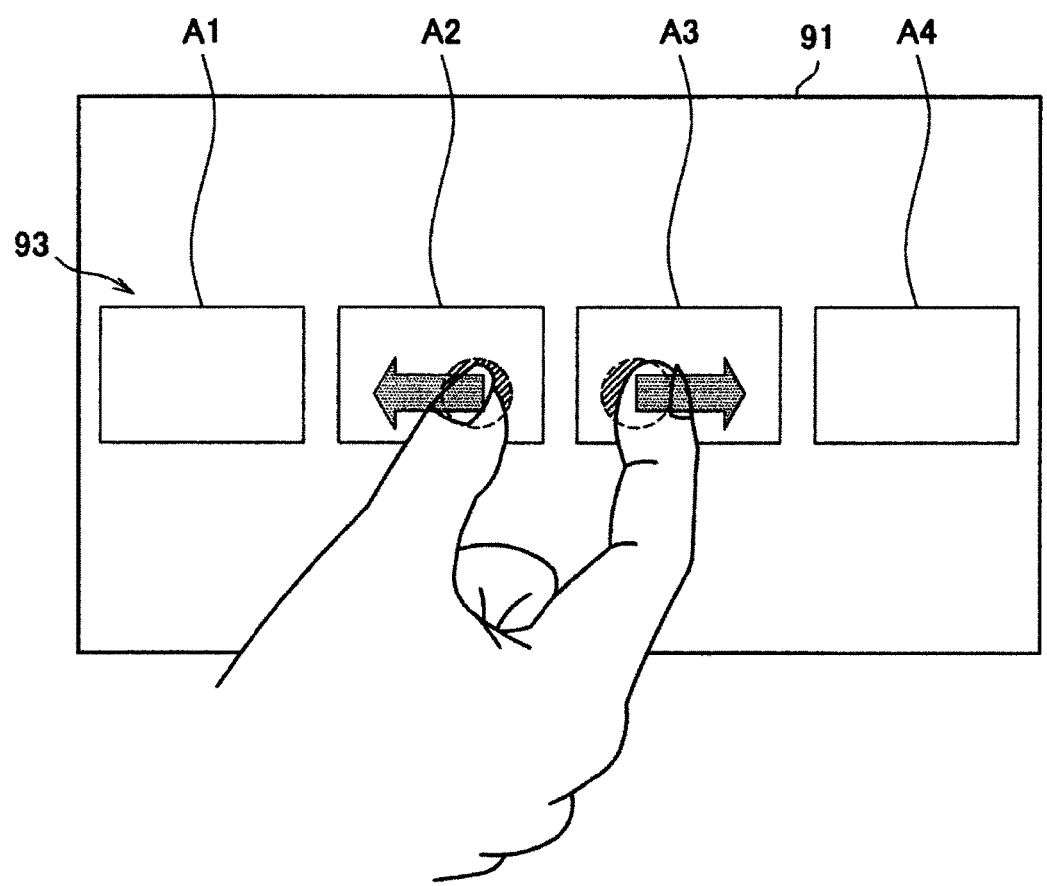
FIG. 22 is a diagram showing a screen that displays a target list in accordance with this embodiment.

FIG. 22 is a diagram showing a screen 91 that displays a target list 93. As shown in FIG. 22, a pinch-out operation of touching list items A2 and A3 of the target list 93 with two fingers and widening the gap between the two touch positions with the screen being touched is detected. Then, the GPU 112 couples the list items of the target list 93 in accordance with the pinch-out operation.

Figure 23:
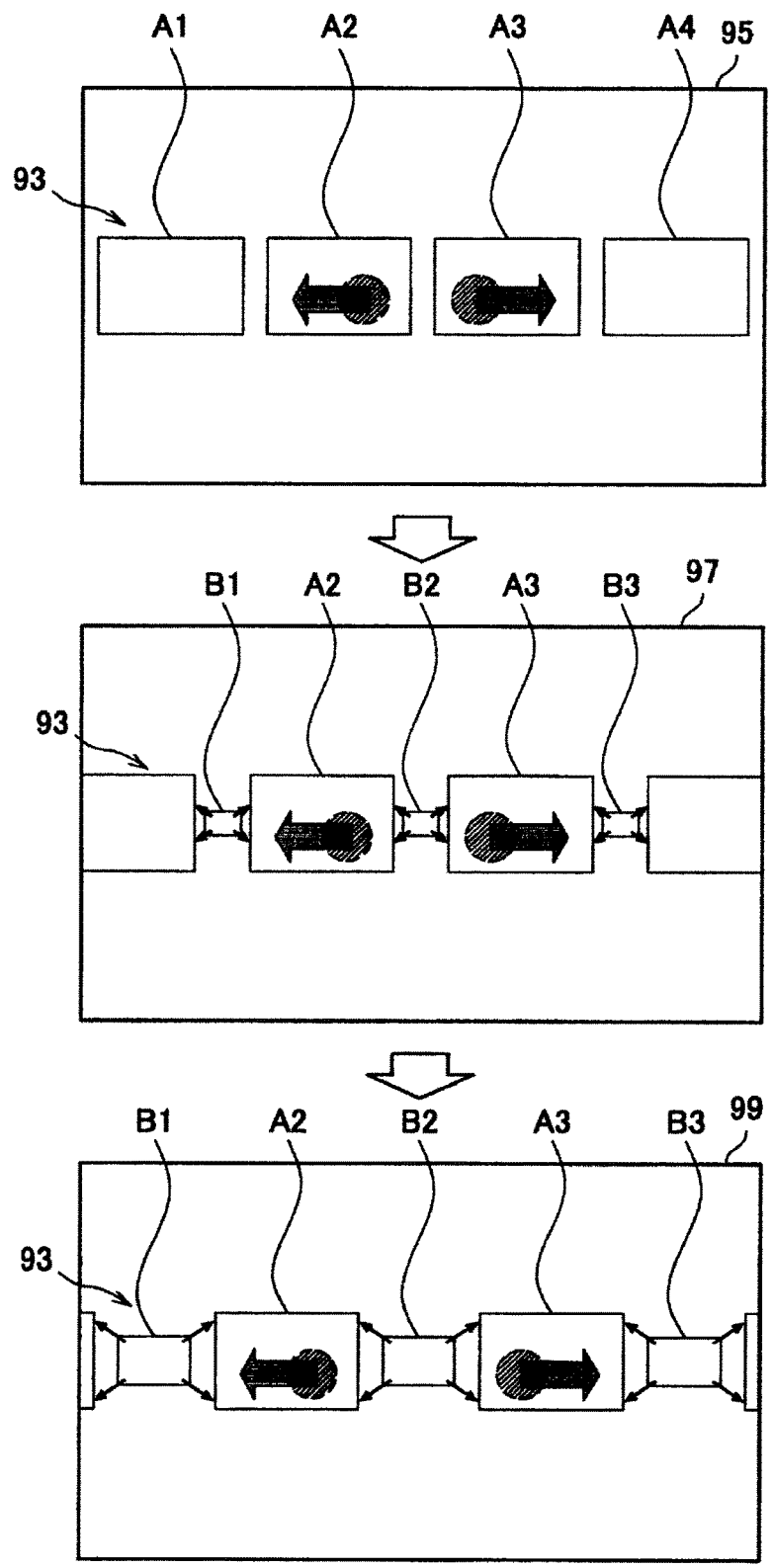
FIG. 23 is a screen transition diagram illustrating an animation when lists are coupled in conjunction with a pinch-out operation in accordance with this embodiment.

FIG. 23 is a screen transition diagram illustrating an animation when list items are coupled in conjunction with a pinch-out operation. As shown in a screen 95 in FIG. 23, an operation (a pinch-out operation) of, with the list item A2 and the list item A3 being touched, increasing the gap between the two touch positions is performed. The GPU 112 moves the display positions of the list item A2 and the list item A3 in accordance with the touch positions of the user.

Next, as shown in a screen 97 and a screen 99, a new list item gradually appears in the space between each list item of the target list 93 widened by the pinch-out operation.

Then, the GPU 112 enlarges the list item made to appear between each list item of the target list 93 so that the size of the list item becomes similar to the size of each list item of the target list 93, whereby coupling of the list items is completed.

Note that the GPU 112 may, when an operation of narrowing the gap between the touch positions of the two fingers performing the pinch-out operation is detected, cancel the coupling of the list items and hide the new list items.

As described above, as the GPU 112 causes new list items to gradually appear in the target list 93 in accordance with a pinch-out operation, the user is able to check in advance the list items to be coupled to the target list 93.

In addition, the user is also able to cancel the coupling of the list items before the completion thereof while checking information that is increased by the coupling.

[3-2. Separation of List Items]

The GPU 112 may, in accordance with a pinch-in operation, cause a predetermined number of list items of a single displayed target list to gradually disappear, and thus separate the list items. As the list items in the target list gradually disappear, the user is able to check in advance the list items to be separated from the target list.

In addition, the GPU 112 may, when an operation of widening the gap between the touch positions of the two fingers performing the pinch-in operation is detected, cancel the separation of the list items, and cause the list items, which have once disappeared, to appear again.

[3-3. List Display]

The aforementioned example has described that the number of list items is increased/decreased by coupling/separation of list items of a single list. Herein, when the number of list items is increased by coupling of list items, some list items are expelled from the screen.

Figure 24:
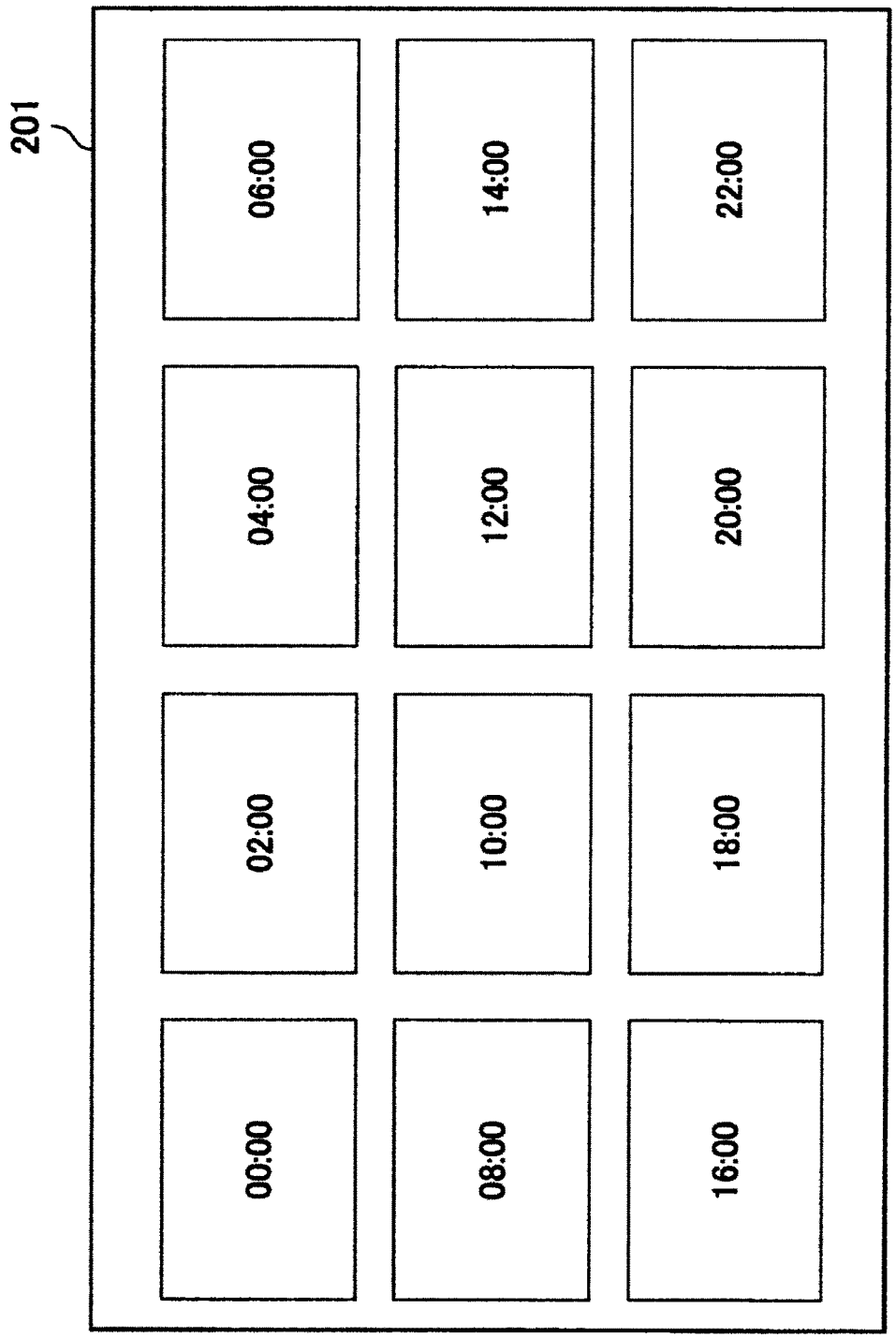
FIG. 24 is a diagram showing a screen that list-displays a single list in accordance with this embodiment.
Figure 25:
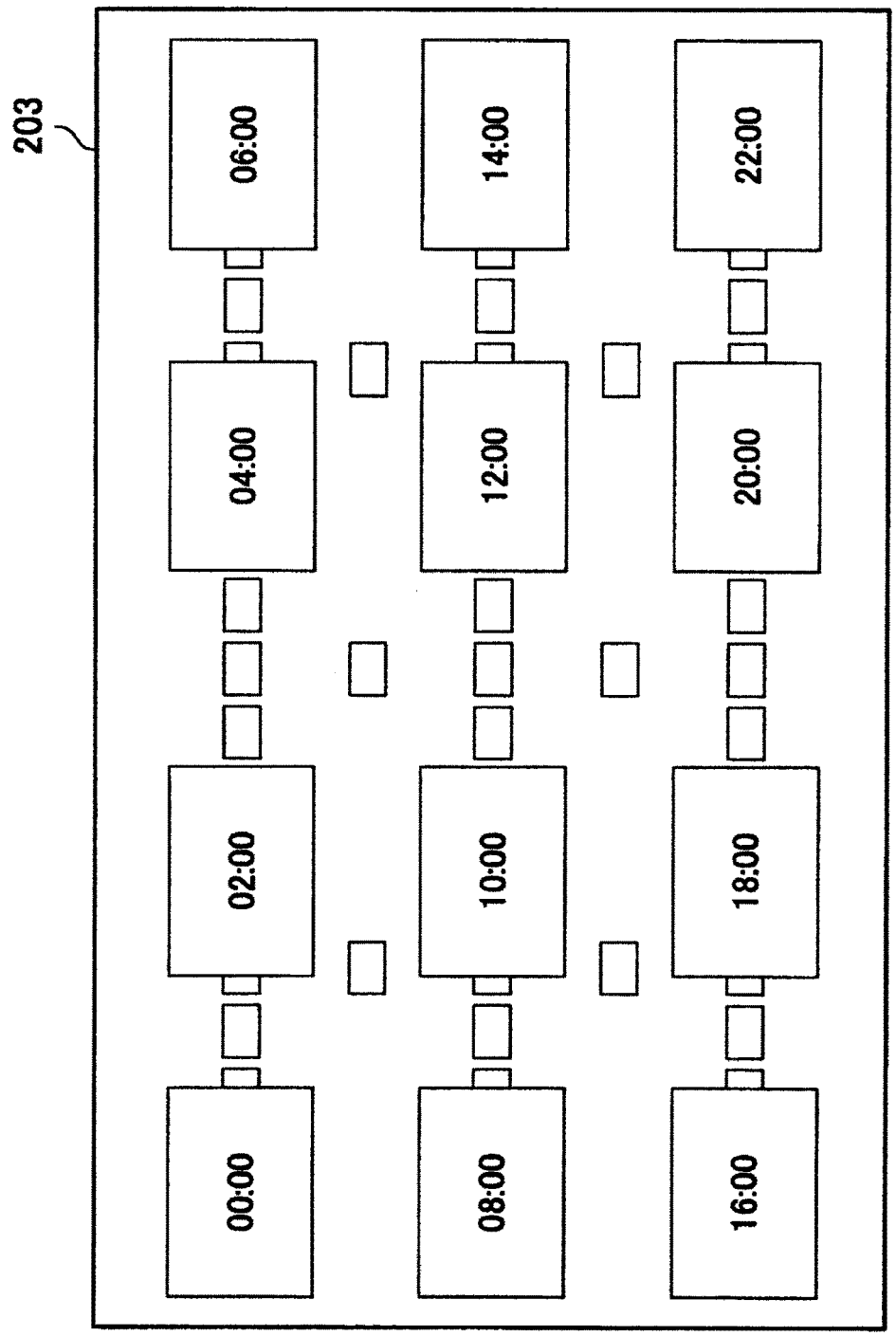
FIG. 25 is a diagram showing a screen showing an animation when lists are being coupled in accordance with this embodiment.
Figure 26:
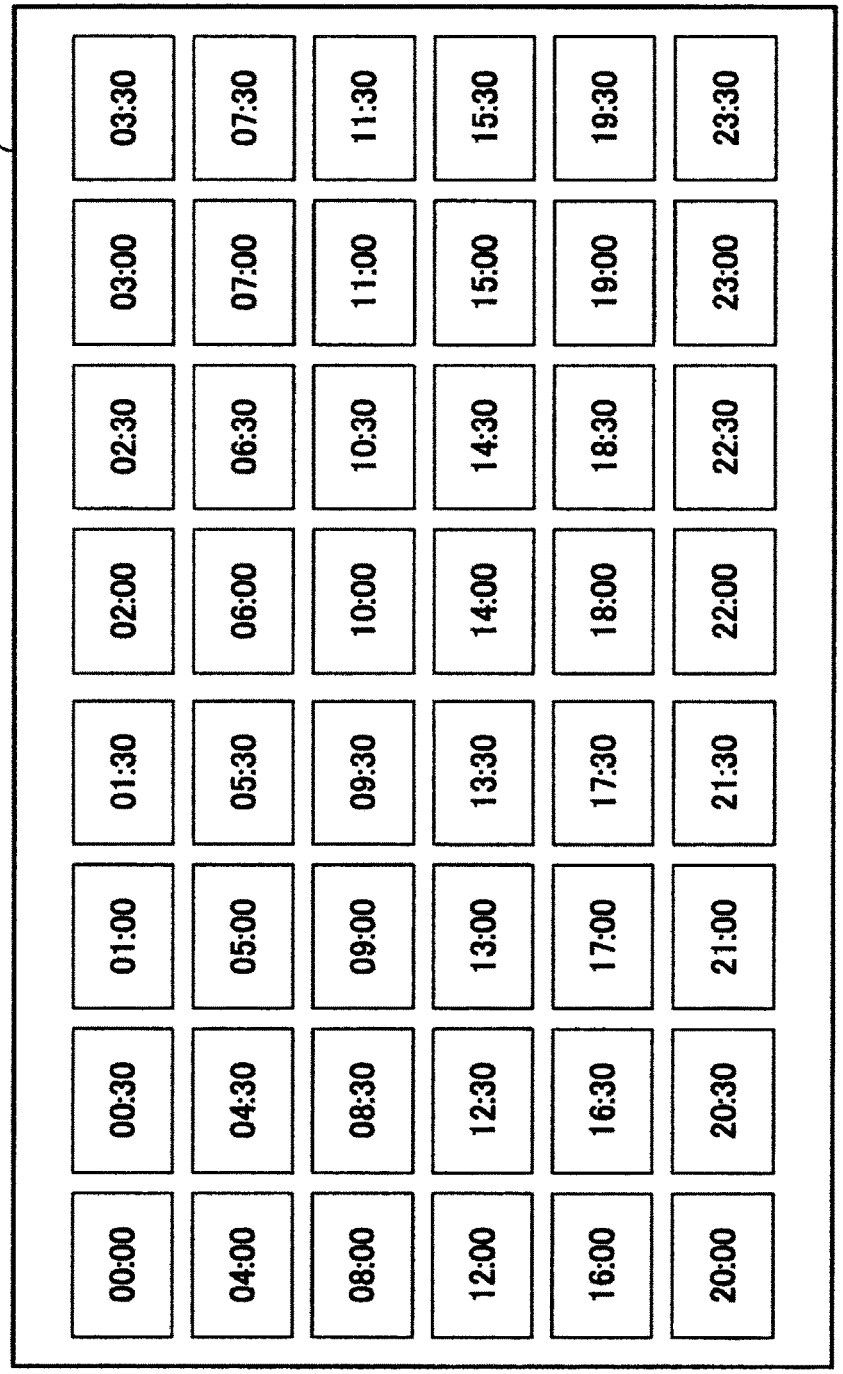
FIG. 26 is a diagram showing a screen when coupling of lists is completed in accordance with this embodiment.

Herein, the GPU 112 in accordance with this embodiment may, when the number of list items of a target list is increased or decreased by coupling of list items, enlarge/shrink the display size of the list items to thereby perform list-display of displaying all list items within the screen. When the GPU 112 performs list-display, the user is able to check all list items that are increased by the coupling of the list items within the screen. List-display of the GPU 112 will be described with reference to FIGS. 24 to 26. In FIGS. 24 to 26, thumbnail images created from scenes of moving image data of every predetermined time period are displayed in a grid-list form as list items.

FIG. 24 is a diagram showing a screen 201 that list-displays a single list. As shown in a screen 201 in FIG. 24, the GPU 112 arranges all thumbnail images of moving image data of every two minutes. An animation when list items are coupled in response to a user operation in this case will be described with reference to FIGS. 25 and 26.

FIG. 25 is a diagram showing a screen 203 that displays an animation when list items are being coupled. As shown in FIG. 25, the GPU 112 shrinks each thumbnail image, and causes new thumbnail images to gradually appear between each thumbnail image.

FIG. 26 is a diagram showing a screen 205 when coupling of list items is completed. As shown in the screen 205 in FIG. 26, even when the number of list items is increased by the coupling of the list items, the GPU 112 displays all thumbnail images on a single screen.

Description has been made above of a case in which a single list is displayed as an example of the aforementioned list-display. However, the GPU 112 may also control list-display when coupling a plurality of lists.

4. Operation Process

Next, an operation process performed when the GPU 112 in accordance with this embodiment performs the aforementioned display control of coupling/separating lists in accordance with a pinch-in/out operation will be described. Although FIGS. 6 and 9 illustrate examples in which the GPU 112 performs display control of coupling/separating lists in accordance with the gap d between two fingers performing pinch-in/out operations, respectively, this embodiment is not limited thereto. For example, the GPU 112 may also couple/separates lists in accordance with, for example, the movement amount of a finger performing a touch operation or the movement speed of the finger. Hereinafter, an operation process performed when the GPU 112 couples/separates lists in accordance with the movement amount or the movement speed of a pinch-in/out operation will be described with reference to FIG. 27.

Figure 27:
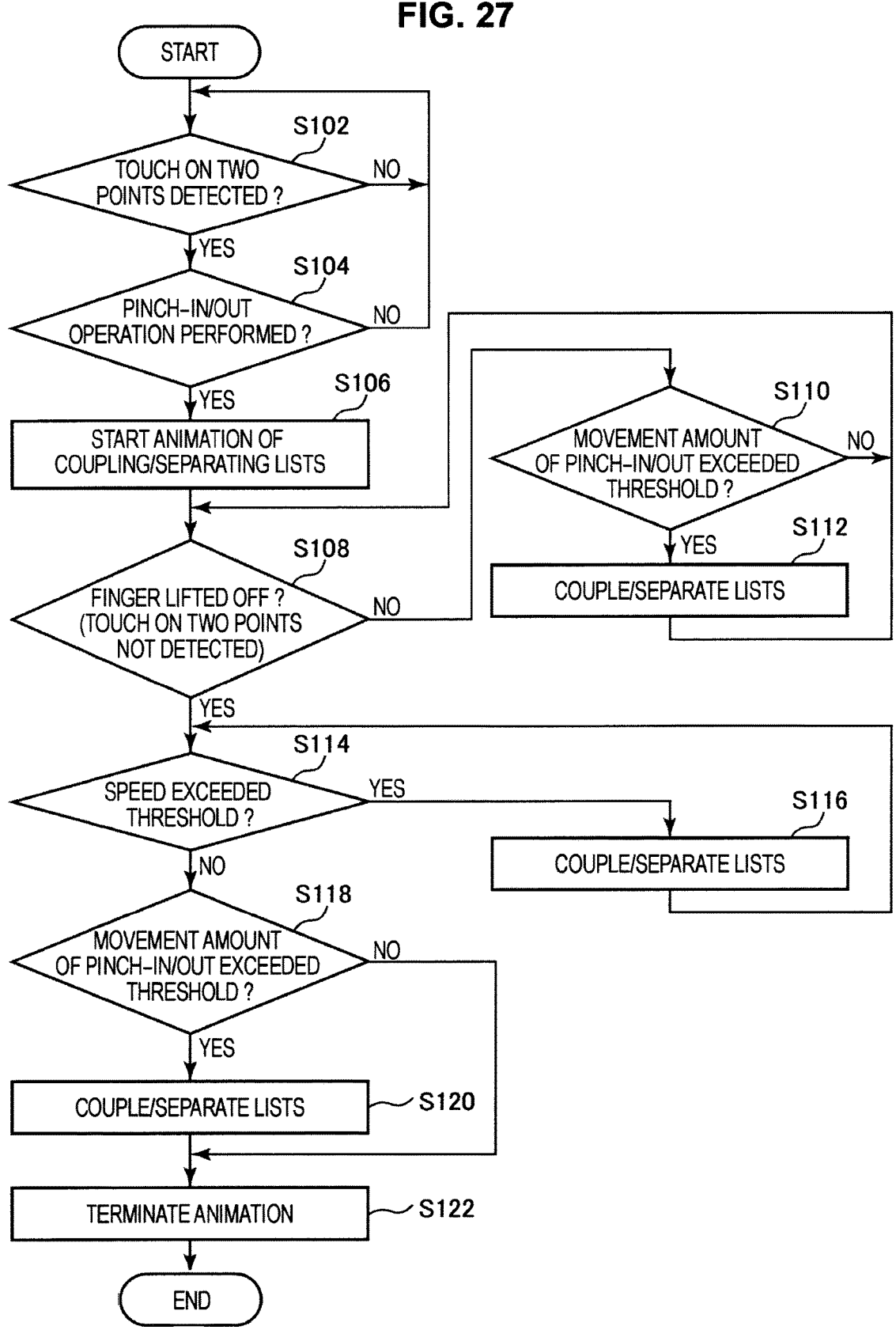
FIG. 27 is a flowchart showing a display control process of coupling/separating lists in accordance with pinch-in/out operations in accordance with this embodiment.

FIG. 27 is a flowchart showing a display control process of coupling/separating lists in accordance with a pinch-in/out operation. As shown in FIG. 27, when the touch panel 16 detects two touches in step S102, the touch panel 16 further detects a pinch-in/out operation on the basis of movements of the operation positions of the two touches in the next step S104. The touch panel 16, upon detecting a pinch-in/out operation, outputs the detection result to the control unit 11.

Next, in step S106, the GPU 112 of the control unit 11, in accordance with the pinch-in/out operation detected by the touch panel 16, starts an animation of coupling/separating lists displayed on the display 15. For example, the GPU 112 moves the touched list item in accordance with the pinch-in/out operation.

Next, in step S108, when the touch panel 16 detects an operation of touching two points, the process proceeds to step S110. Next, in step S110, the GPU 112 determines if the movement amount of the pinch-in/out operation is greater than a threshold. The movement amount of the pinch-in/out operation used herein is calculated as shown in FIG. 28, for example.

Figure 28:
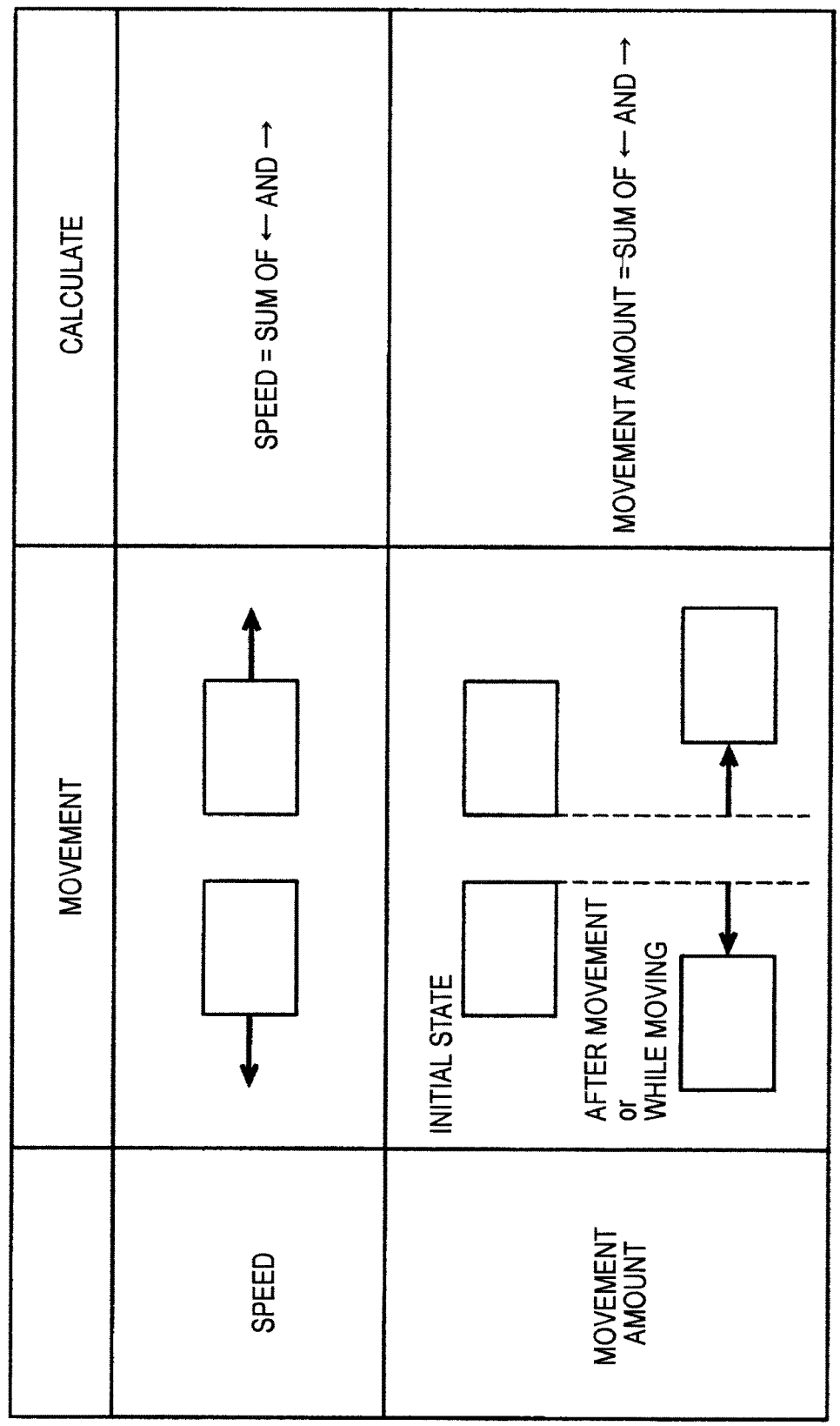
FIG. 28 is a table exemplarily showing calculation of the movement amount and the movement speed of pinch-in/out operations in accordance with this embodiment.

FIG. 28 is a table exemplarily showing calculation of the movement amount and the movement speed of pinch-in/out operations. As shown in FIG. 28, the movement amount of each of pinch-in/out operations is the sum of the distance of movement of a list item from the initial state in the pinch-in/out operation.

Alternatively, the movement amount of each of pinch-in/out operations may be the sum of the distance of movement of each of the two touch positions of the pinch-in/out operation.

In the aforementioned step S110, if the movement amount of the pinch-in/out operation exceeds the threshold, the process proceeds to step S112. Next, in step S112, the GPU 112 couples/separates lists. Note that if the movement amount exceeds a first threshold in step S110, coupling/separation of lists at one level is performed in step S112. For example, a single sub-list is coupled or a single sub-list is created through separation.

Next, the process proceeds to step S108, and the pinch-in/out operation is further continued. Then, if the movement amount exceeds a second threshold in step S110, the GPU 112 performs coupling/separation of lists at another level. For example, the GPU 112 couples one more sub-list, or creates one more sub-list through separation. As described above, the GPU 112 performs coupling/separation of lists at multiple levels in accordance with a pinch-in/out operation.

Next, referring again to step S108, a case in which the two touches are no more detected will be detected. In this case, the process proceeds to step S114, and the GPU 112 determines if the speed of the pinch-in/out operation exceeds a threshold in step S114. The speed of a pinch-in/out operation used herein is the sum of the movement speed of each list item in the pinch-in/out operation as shown in FIG. 28, for example.

If the movement speed of the pinch-in/out operation exceeds the threshold in the aforementioned step S114, the process proceeds to step S116. Next, in step S116, the GPU 112 performs coupling/separation of lists. Note that if the movement speed exceeds a first threshold in step S114, coupling/separation of lists at one level is performed in step S116. For example, a single sub-list is coupled, or a single sub-list is created through separation.

Next, the process returns to step S114, and if the movement speed is not still zero, the GPU 112 performs coupling/separation of lists at another level in step S116 again. For example, the GPU 112 couples one more sub-list, or creates one more sub-list through separation. As described above, the GPU 112 performs coupling/separation of lists at multiple levels in accordance with the speed of a list item moved in accordance with a pinch-in/out operation.

Meanwhile, if the speed does not exceed the threshold in step S114, the process proceeds to step S118. In step S118, the GPU 112 determines if the movement amount of the pinch-in/out operation exceeds the threshold. If the movement amount exceeds the threshold, the process proceeds to step S120.

Next, in step S120, the GPU 112 performs coupling/separation of lists. Note that the GPU 112 may also have a plurality of thresholds and may control the levels of coupling/separation of lists in accordance with which threshold the movement amount of the pinch-in/out operation has exceeded. For example, if the movement amount of a pinch-in/out operation exceeds a threshold a, the GPU 112 couples a sub-list, or creates a sub-list through separation. Meanwhile, if the movement amount of a pinch-in/out operation exceeds a threshold b, the GPU 112 couples two sub-lists, or creates two sub-lists through separation.

Next, in step S122, the GPU 112 terminates the animation of coupling/separating lists.

5. Conclusion

As described above, according to the information processing device 10 in accordance with this embodiment, a user is able to, by displaying a plurality of lists on a screen, check in advance the list items of the sub-list 25 to be coupled to the target list 23.

In addition, according to the information processing device 10 in accordance with this embodiment, even when a single list is displayed on the screen, if new list items are caused to gradually appear in the list in response to a user operation, the user is able to check in advance the list items to be added before the completion of the coupling.

In addition, as the list items to be separated from the target list 23 gradually change in accordance with a user operation, the user is able to check in advance the list items to be removed from the target list 23 by the separation of the list items.

Further, the user is also able to, while checking the list items that are increased or decreased by an animation of coupling or separating lists, cancel the coupling or separation of the lists before the completion thereof.

In addition, when the number of list items is increased by coupling of list items, the GPU 112 can, by controlling all list items such that they are displayed within the screen, display more detailed information while securing the list properties of the list.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although an animation when lists are coupled in conjunction with a pinch-out operation in the aforementioned [2-3. User Operation] has been described with reference to FIG. 6, the animation when lists are coupled is not limited to the example shown in FIG. 6. For example, each list item of the sub-list 25*a* to be coupled may be gradually be enlarged substantially at the same time as the start timing of the movement of the list item toward the target list 23, and the enlargement of the list item may be terminated substantially at the same time as the termination of insertion of the list item between each list item of the target list 23. FIG. 29 shows an example of changing an animation when lists are coupled in conjunction with a pinch-out operation as described above. As shown in a screen 44 in FIG. 29, when the gap d2 between the touch positions exceeds a threshold, a list item B2 of the sub-list 25*b* moves while being gradually enlarged. Then, as shown in the screen 46, the enlargement of the list item terminates substantially at the same time as when the list item is inserted between the list item A2 and the list item A3.

Although the target list 23, the sub-list 25*a*, and the sub-list 25*b* are sequentially displayed in the aforementioned embodiment, each list may be switched or all lists may be moved in accordance with a user operation.

hi addition, although the information processing device 10 shown in FIG. 1 is implemented by a mobile terminal such as a smartphone or a portable audio player, the information processing device 10 in accordance with the present disclosure is not limited thereto. For example, the information processing device 10 may implement a personal computer (PC), and an animation of coupling or separating lists in response to a user operation may be displayed on the GUI screen of the PC.

It is also possible to create a computer program for exerting a function that is equivalent to each configuration of the information processing device 10 in accordance with the aforementioned embodiment. In addition, a recording medium having the computer program recorded thereon is also provided. Examples of the recording medium include a magnetic disk, an optical disc, a magneto-optical disc, and flash memory. In addition, the aforementioned computer program may be distributed over a network without using a recording medium, for example.

The present technology may also be configured as below.
(1) An information processing device comprising:
  a detection unit configured to detect a user operation; and
  a display control unit configured to display a list including list items, and perform display of, in response to a detected user operation, causing new list items to gradually appear in the list.
(2) The information processing device according to (1), wherein the display control unit is configured to, when the detection unit detects an operation of widening a distance between a plurality of operation positions, perform display of causing new list items to gradually appear in the list.
(3) The information processing device according to (1) or (2), wherein the display control unit is configured to, when the detection unit detects an operation of narrowing a distance between a plurality of operation positions, perform display of causing a predetermined number of list items in the list to gradually disappear.
(4) The information processing device according to any one of (1) to (3), wherein the display control unit is configured to, in accordance with a movement amount or a movement speed of the operation positions, change the number of list items to appear in or disappear from the list.
(5) The information processing device according to any one of (1) to (4), wherein the display control unit is configured to, when the list has an increased number of list items with the new list items having appeared in the list, change a size of each list item and display all list items in the list within a display screen.
(6) An information processing method, comprising:
  detecting a user operation; and
  displaying a list including list items, and performing display of, in response to a detected user operation, causing new list items to gradually appear in the list.
(7) A program causing a computer to execute processes of:
  detecting a user operation; and
  displaying a list including list items, and performing display of, in response to a detected user operation, causing new list items to gradually appear in the list.
(8) The program according to (7), causing a computer to further execute, when the detection process detects an operation of widening a distance between a plurality of operation positions, a process of performing display of causing new list items to gradually appear in the list.
(9) The program according to (7) or (8), causing a computer to further execute, when the detection process detects an operation of narrowing a distance between a plurality of operation positions, a process of performing display of causing a predetermined number of list items in the list to gradually disappear.
(10) The program according to any one of (7) to (9), causing a computer to further execute, in accordance with a movement amount or a movement speed of the operation positions, a process of changing the number of list items to appear in or disappear from the list.
(11) The program according to any one of (7) to (10), causing a computer to further execute, when the list has an increased number of list items with the new list items having appeared in the list, changing a size of each list item and display all list items in the list within a display screen.

The present disclosure contains subject matter related to that disclosed in Japanese Priority Patent Application JP 2011-168261 filed in the Japan Patent Office on Aug. 1, 2011, the entire content of which is hereby incorporated by reference.

What is claimed is:
1. An information processing device comprising:
  circuitry configured to
    initiate display of a first list including first list items, and
    control display of, in response to a detected user operation, causing either one or more additional list items to appear into the first list or one or more existing list items of the first list to disappear from the first list, wherein the list items are displayed as thumbnail images representing one or more items, wherein when the detected user operation is an operation of narrowing a distance between a plurality of operation positions, a predetermined number of the first list items of the first list is caused to gradually disappear from the first list, and wherein the predetermined number of the first list items of the first list is caused to gradually disappear from the first list in accordance with a movement amount or a movement speed of the user operation such that during a partial period of time of when the user operation is detected, the circuitry controls display of the predetermined number of the first list items to move by an amount that is determined based on a distance associated with the movement amount of the user operation during the partial period of time or a magnitude of the movement speed of the user operation during the partial period of time, and after elapse of the partial period of time but before completion of the user operation, the predetermined number of the first list items is caused to disappear from the first list and remain in a non-displayed state during a remainder of the period of time of detecting the user operation after the elapse of the partial period of time, and further movement of the user operation during the remainder of the period of time changes a hierarchical level of display.

2. The information processing device according to claim 1, wherein the circuitry is further configured to, when a subsequent operation of widening the distance between the plurality of operation positions is detected subsequent to the detected user operation of narrowing the distance between the plurality of operation positions, control display of causing the predetermined number of the first list items to gradually reappear into the first list.

3. The information processing device according to claim 1, wherein when the detected user operation is an operation of widening the distance between the plurality of operation positions, a predetermined number of the one or more additional list items is caused to gradually appear into the first list.

4. The information processing device according to claim 3, wherein when the detected user operation is the operation of widening the distance between the plurality of operation positions, the predetermined number of the one or more additional list items is caused to move towards the first list and gradually appear into the first list.

5. The information processing device according to claim 3, wherein the circuitry is further configured to, when a subsequent operation of narrowing a distance between the plurality of operation positions is detected subsequent to the detected user operation of widening the distance between the plurality of operation positions, control display of causing the predetermined number of the one or more additional list items to gradually disappear from the first list.

6. The information processing device according to claim 1, wherein when the one or more additional list items are caused to appear into the first list, the circuitry is further configured to change a displaying size of each list item of the first list and display all list items within a display screen.

7. The information processing device according to claim 1, wherein when the detected user operation is the operation of narrowing the distance between the plurality of operation positions, the predetermined number of the first list items of the first list is caused to gradually disappear from the first list by displaying the predetermined number of the first list items of the first list to move away from remaining list items of the first list.

8. The information processing device according to claim 1, wherein the one or more additional list items are caused to gradually appear to be displayed in between the first list items in an alternating manner.

9. The information processing device according to claim 1, wherein the one or more additional list items are caused to gradually appear to be displayed in between the first list items of the list by moving the one or more additional list items to be alternatingly inserted between adjacent ones of the first list items.

10. The information processing device according to claim 1, wherein the user operation is performed in relation to the displayed first list.

11. The information processing device according to claim 1, wherein the first list and the one or more additional list items are all being displayed prior to detection of the user operation.

12. The information processing device according to claim 1, wherein each list item is displayed as a respective thumbnail image that represents one or more items.

13. The information processing device according to claim 1, wherein each thumbnail image represents a plurality of items.

14. The information processing device according to claim 1, wherein a representation of displaying the thumbnail images is based on a predetermined value.

15. The information processing device according to claim 1, wherein the circuitry is further configured to, when a subsequent operation of widening the distance between the plurality of operation positions is detected subsequent to the detected user operation of narrowing the distance between the plurality of operation positions, control display of causing different thumbnail images to appear.

16. An information processing method comprising:
displaying a first list including first list items; and
controlling display of, in response to a detected user operation, causing either one or more additional list items to appear into the first list or one or more existing list items of the first list to disappear from the first list,
wherein the list items are displayed as thumbnail images representing one or more items,
wherein when the detected user operation is an operation of narrowing a distance between a plurality of operation positions, a predetermined number of the first list items of the first list is caused to gradually disappear from the first list, and
wherein the predetermined number of the first list items of the first list is caused to gradually disappear from the first list in accordance with a movement amount or a movement speed of the user operation such that during a partial period of time of when the user operation is detected, the predetermined number of the first list items moves by an amount that is determined based on a distance associated with the movement amount of the user operation during the partial period of time or a magnitude of the movement speed of the user operation during the partial period of time, and after elapse of the partial period of time but before completion of the user operation, the predetermined number of the first list items is caused to disappear from the first list and remain in a non-displayed state during a remainder of the period of time of detecting the user operation after the elapse of the partial period of time, and further movement of the user operation during the remainder of the period of time changes a hierarchical level of display.

17. A non-transitory computer-readable medium having embodied thereon a program, which when executed by a computer causes the computer to execute a method, the method comprising:

displaying a first list including first list items; and controlling display of, in response to a detected user operation, causing either one or more additional list items to appear into the first list or one or more existing list items of the first list to disappear from the first list, wherein the list items are displayed as thumbnail images representing one or more items, wherein when the detected user operation is an operation of narrowing a distance between a plurality of operation positions, a predetermined number of the first list items of the first list is caused to gradually disappear from the first list, and wherein the predetermined number of the first list items of the first list is caused to gradually disappear from the first list in accordance with a movement amount or a movement speed of the user operation such that during a partial period of time of when the user operation is detected, the predetermined number of the first list items moves by an amount that is determined based on a distance associated with the movement amount of the user operation during the partial period of time or a magnitude of the movement speed of the user operation during the partial period of time, and after elapse of the partial period of time but before completion of the user operation, the predetermined number of the first list items is caused to disappear from the first list and remain in a non-displayed state during a remainder of the period of time of detecting the user operation after the elapse of the partial period of time, and further movement of the user operation during the remainder of the period of time changes a hierarchical level of display.

18. The non-transitory computer-readable medium according to claim 17, wherein when the detected user operation is an operation of widening the distance between the plurality of operation positions, a predetermined number of the one or more additional list items is caused to gradually appear into the first list.

19. The non-transitory computer-readable medium according to claim 18, wherein when the detected user operation is the operation of widening the distance between the plurality of operation positions, the predetermined number of the one or more additional list items is caused to move towards the first list and gradually appear into the first list.

20. The non-transitory computer-readable medium according to claim 17, wherein when the one or more additional list items are caused to appear into the first list, a displaying size of each list item of the first list is changed and all list items are displayed within a display screen.

21. The non-transitory computer-readable medium according to claim 17, wherein when the detected user operation is the operation of narrowing the distance between the plurality of operation positions, the predetermined number of the first list items of the first list is caused to gradually disappear from the first list by displaying the predetermined number of the first list items of the first list to move away from remaining list items of the first list.

* * * * *